United States Patent
Nakamura et al.

(10) Patent No.: US 9,277,556 B2
(45) Date of Patent: Mar. 1, 2016

(54) PERMITTING A PLURALITY OF TRANSMIT ANTENNAS TO TRANSMIT THE SAME DATA TO IMPROVE THE RECEPTION QUALITY THROUGH TRANSMIT DIVERSITY

(75) Inventors: Osamu Nakamura, Osaka (JP); Hiroki Takahashi, Osaka (JP); Jungo Goto, Osaka (JP); Kazunari Yokomakura, Osaka (JP); Yasuhiro Hamaguchi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 362 days.

(21) Appl. No.: 13/805,556

(22) PCT Filed: May 18, 2011

(86) PCT No.: PCT/JP2011/061416
§ 371 (c)(1),
(2), (4) Date: Dec. 19, 2012

(87) PCT Pub. No.: WO2011/162051
PCT Pub. Date: Dec. 29, 2011

(65) Prior Publication Data
US 2013/0100914 A1 Apr. 25, 2013

(30) Foreign Application Priority Data
Jun. 25, 2010 (JP) .................. 2010-145691

(51) Int. Cl.
*H04L 12/28* (2006.01)
*H04W 72/04* (2009.01)
(Continued)

(52) U.S. Cl.
CPC ......... *H04W 72/0453* (2013.01); *H04B 7/0413* (2013.01); *H04B 7/068* (2013.01);
(Continued)

(58) Field of Classification Search
CPC . H04L 25/03343; H04L 27/01; H04L 5/0023; H04L 5/0044; H04L 5/0048; H04L 2025/03426; H04L 5/0053; H04B 7/0413; H04B 7/068; H04B 7/0639; H04W 72/0453
USPC .......................................... 370/252, 329, 430
See application file for complete search history.

(56) References Cited

U.S. PATENT DOCUMENTS 8,494,006 B2 * 7/2013 Lee .............................. 370/203
2007/0211815 A1 * 9/2007 Pan et al. ..................... 375/267
(Continued)

FOREIGN PATENT DOCUMENTS

JP 2005-531219 A 10/2005
JP 2008-199598 A 8/2008
(Continued)

OTHER PUBLICATIONS

3GPP, "Further advancements for E-UTRA physical layer aspects," 3rd Generation Partnership Project, Technical Specification Group Radio Access Network, 3GPP TR 36.814 V9.0.0, Mar. 2010.
(Continued)

*Primary Examiner* — John Pezzlo
(74) *Attorney, Agent, or Firm* — Birch, Stewart, Kolasch & Birch, LLP

(57) ABSTRACT

There are included a plurality of mapping units to which a plurality of data signal sequences related to the same data signal sequence are input via spectra cyclic shift units and which arrange the input data signal sequences on the frequency axis and output the arranged data signal sequences as transmission frequency spectra; an assignment information acquisition unit that controls the plurality of mapping units based on assignment information to cause the data signal sequences arranged on the frequency axis to partially overlap; the spectra cyclic shift units shifting, under control of an amount-of-shift decision unit, the input data signal sequences by an amount of cyclic shift to cause partially overlapping data signals to be identical and outputting the data signal sequences; and a plurality of transmit antennas that send out the transmission frequency spectra output by the plurality of mapping units.

19 Claims, 31 Drawing Sheets

(51) Int. Cl.
*H04B 7/04* (2006.01)
*H04L 27/01* (2006.01)
*H04J 1/16* (2006.01)
*H04L 5/00* (2006.01)
*H04L 25/03* (2006.01)
*H04B 7/06* (2006.01)

(52) U.S. Cl.
CPC ............ *H04L 27/01* (2013.01); *H04B 7/0639* (2013.01); *H04L 5/0023* (2013.01); *H04L 5/0044* (2013.01); *H04L 5/0048* (2013.01); *H04L 25/03343* (2013.01); *H04L 2025/03426* (2013.01)

(56) References Cited

U.S. PATENT DOCUMENTS

| | | | |
|---|---|---|---|
| 2008/0075184 A1* | 3/2008 | Muharemovic et al. | 375/260 |
| 2008/0168114 A1* | 7/2008 | Han et al. | 708/209 |
| 2009/0116573 A1* | 5/2009 | Gaal et al. | 375/267 |
| 2009/0262845 A1* | 10/2009 | Park et al. | 375/260 |
| 2009/0303868 A1* | 12/2009 | Kimura | 370/210 |
| 2010/0074343 A1* | 3/2010 | Gaal et al. | 375/259 |
| 2010/0091903 A1* | 4/2010 | Castelain et al. | 375/295 |
| 2010/0103919 A1 | 4/2010 | Murakami et al. | |
| 2010/0104037 A1* | 4/2010 | Jongren | 375/260 |
| 2010/0195749 A1* | 8/2010 | Kimura et al. | 375/260 |
| 2010/0260154 A1* | 10/2010 | Frank | G01S 5/10 370/336 |
| 2011/0212743 A1 | 9/2011 | Yokomakura et al. | |
| 2012/0106373 A1* | 5/2012 | Gaal et al. | 370/252 |

FOREIGN PATENT DOCUMENTS

| | | |
|---|---|---|
| JP | 2010-4102 A | 1/2010 |
| WO | WO 2004/002011 A1 | 12/2003 |
| WO | WO 2008/004835 A2 | 1/2008 |
| WO | WO 2009/022709 A1 | 2/2009 |
| WO | WO 2009/100212 A2 | 8/2009 |
| WO | WO 2010/070852 A1 | 6/2010 |

OTHER PUBLICATIONS

International Search Report issued in PCT/JP2011/061416 mailed Aug. 9, 2011.

* cited by examiner

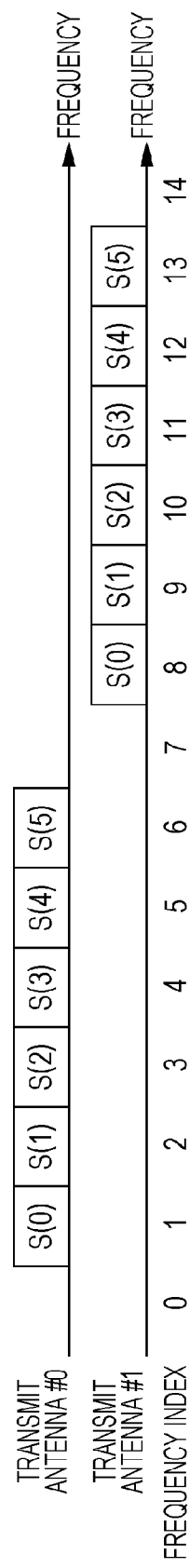

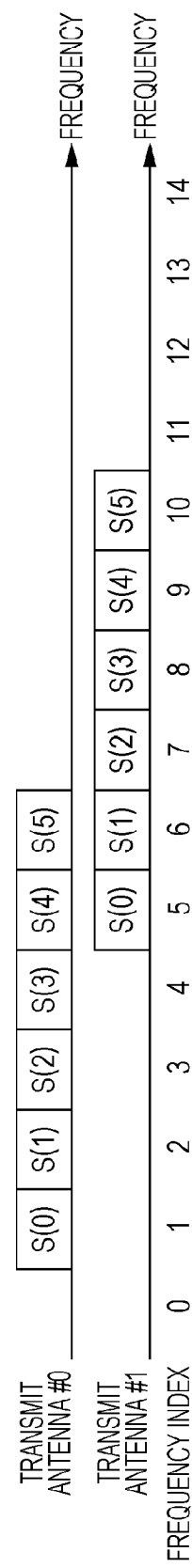

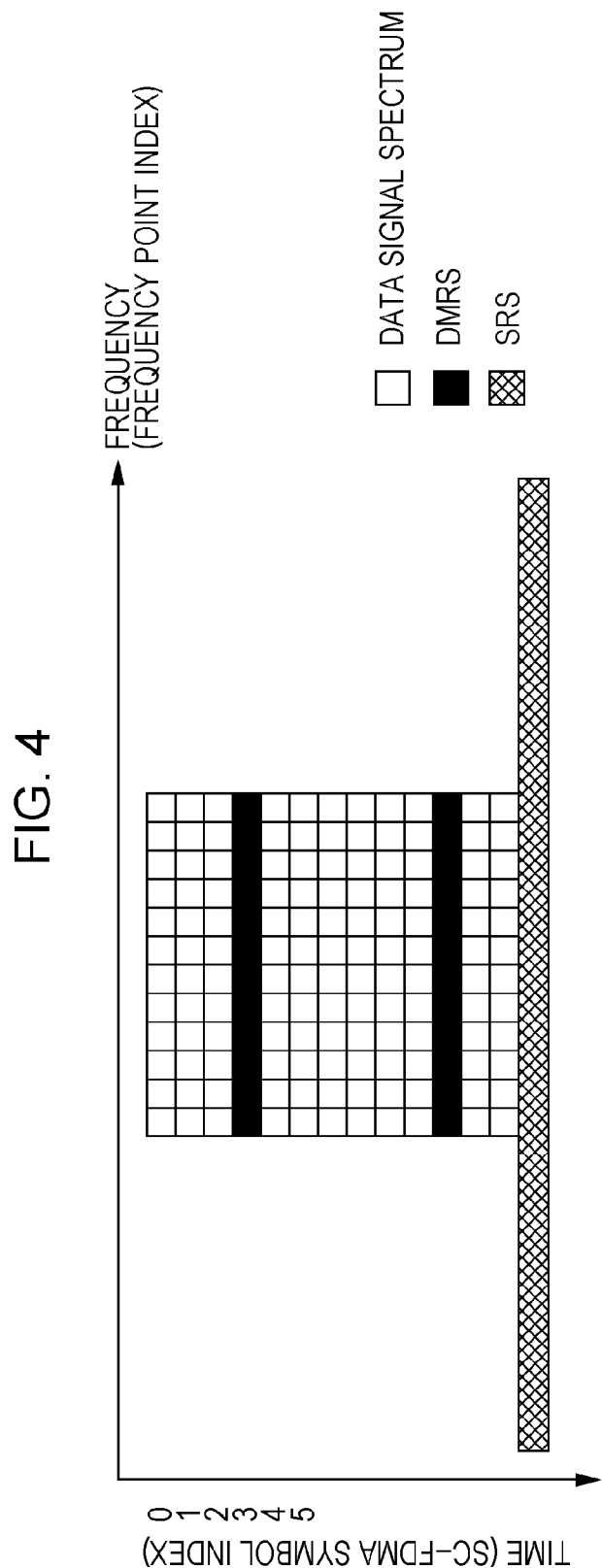

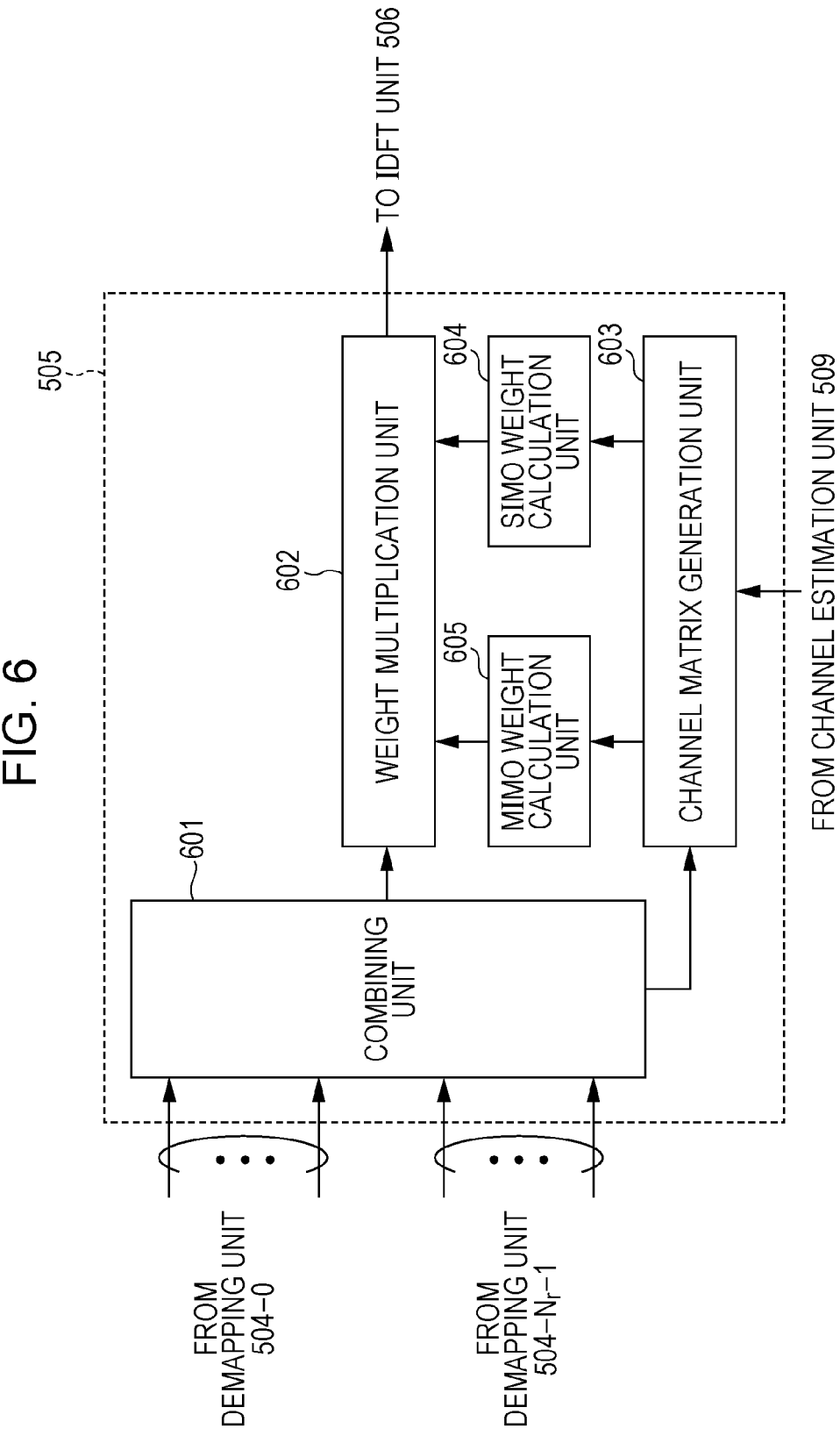

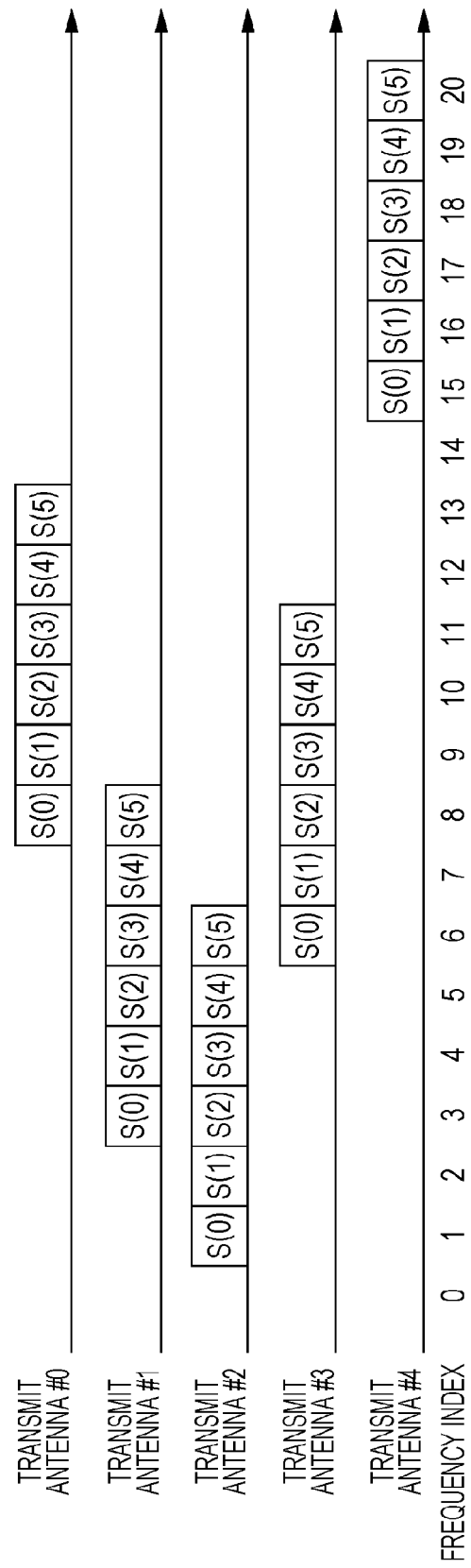

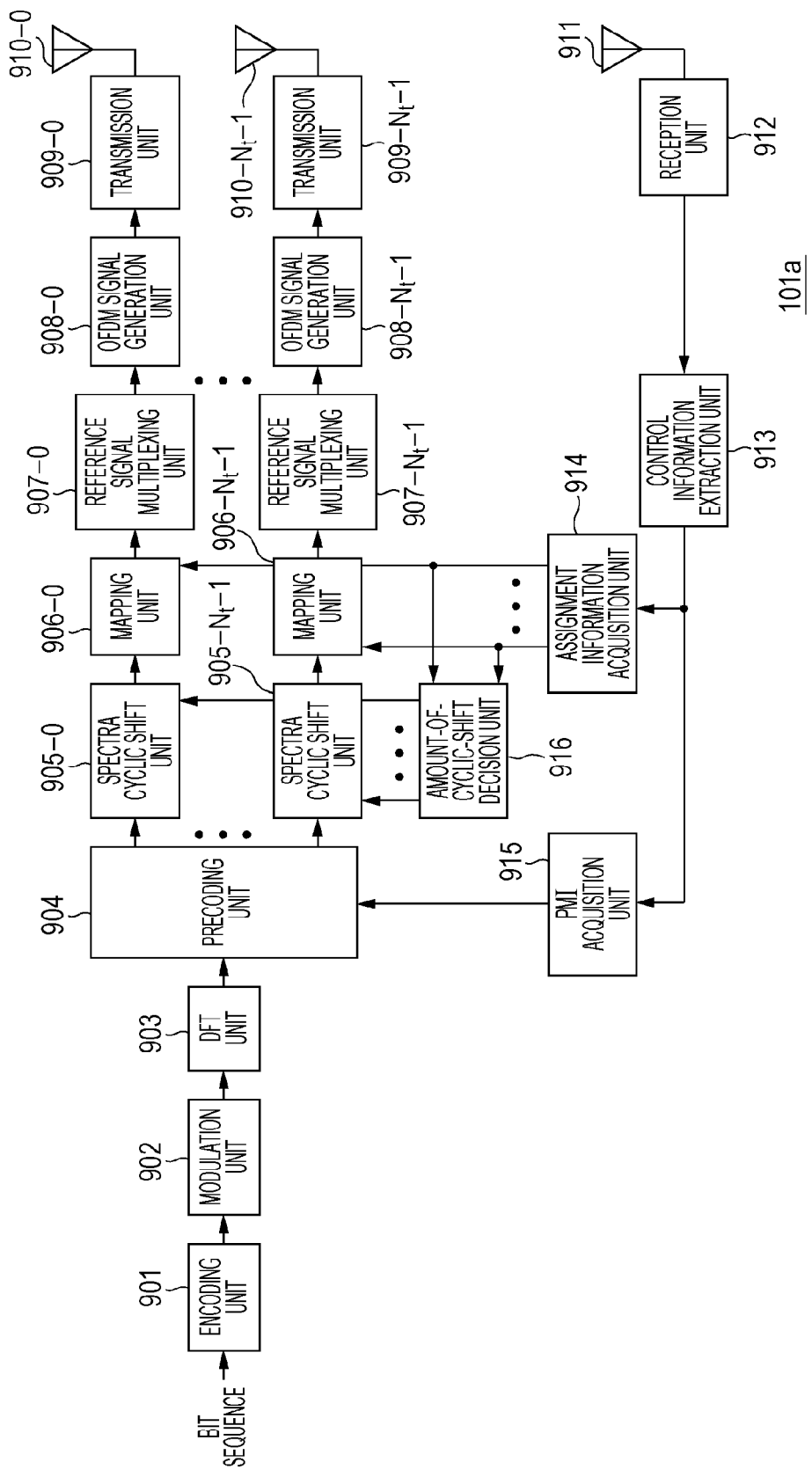

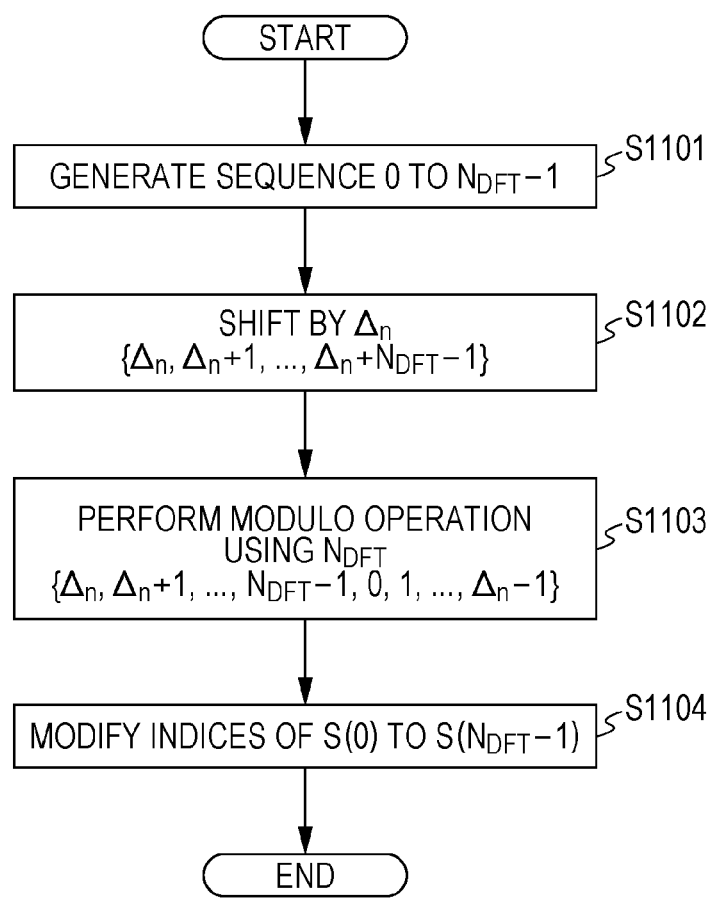

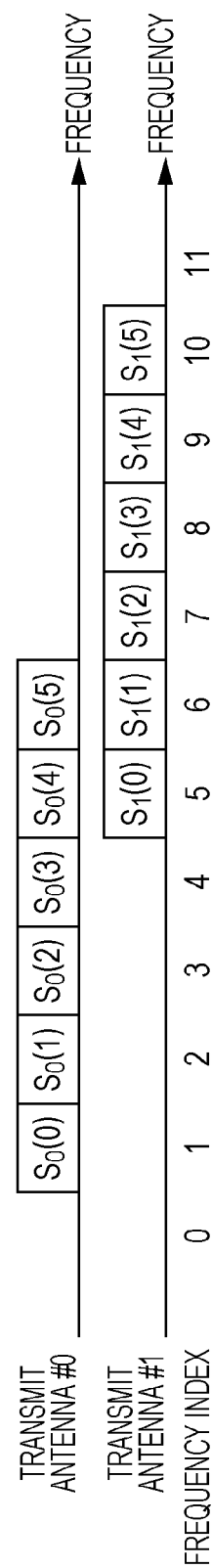

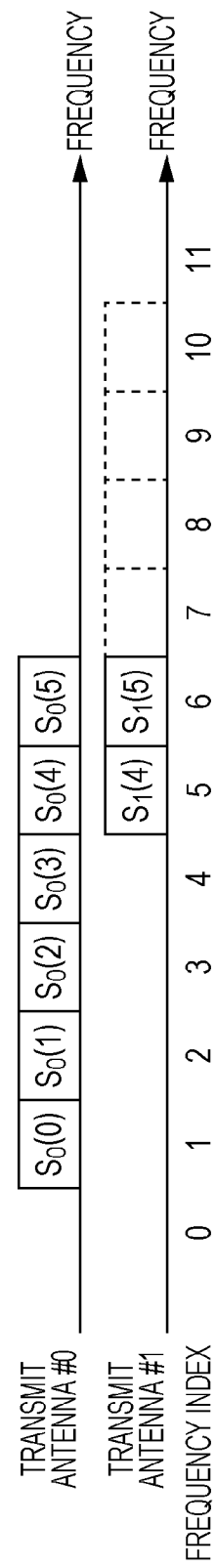

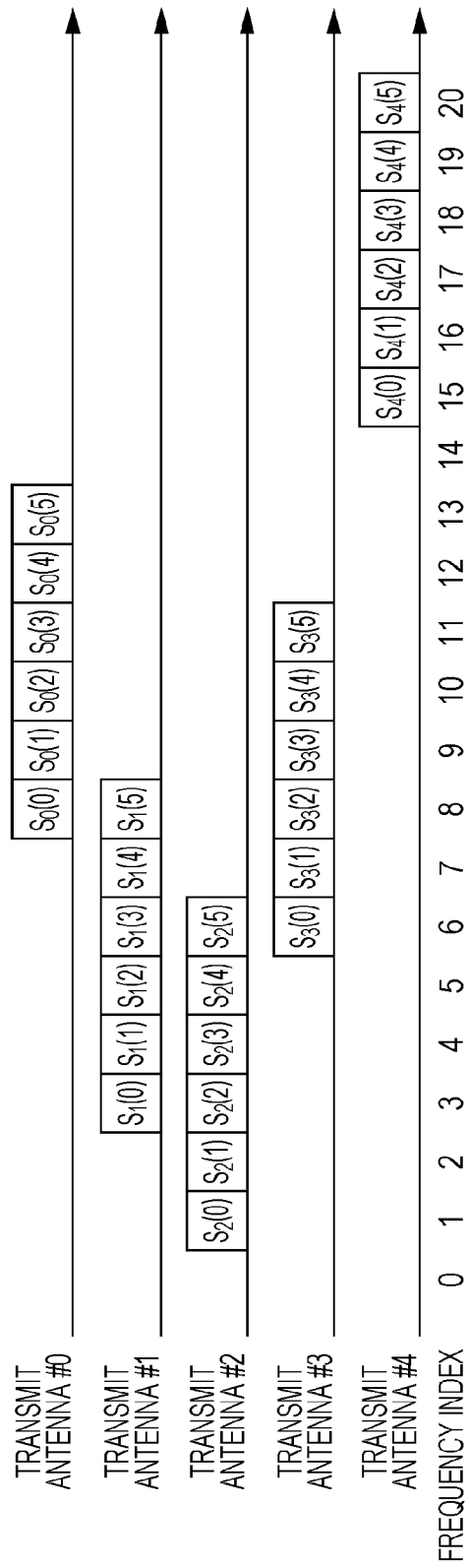

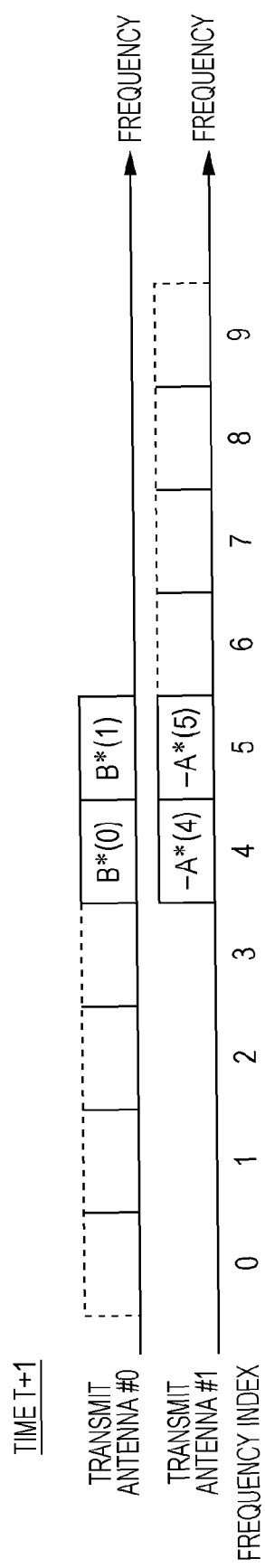

PERMITTING A PLURALITY OF TRANSMIT ANTENNAS TO TRANSMIT THE SAME DATA TO IMPROVE THE RECEPTION QUALITY THROUGH TRANSMIT DIVERSITY

TECHNICAL FIELD

The present invention relates to communication systems, communication apparatuses, and communication methods.

Priority is claimed on Japanese Patent Application No. 2010-145691, filed Jun. 25, 2010, the content of which is incorporated herein by reference.

BACKGROUND ART

Communication systems, particularly, mobile-phone-related wireless communication systems, are continuously developing as high-speed and high-capacity communication systems. LTE (Long Term Evolution, the 3.9G wireless access technology), which is a wireless communication standard by 3GPP (3rd Generation Partnership Project), and LTE-A (LTE-Advanced, the evolved version of LTE), which is the advanced form of LTE, adopt OFDMA (Orthogonal Frequency Division Multiple Access) as a transmission scheme for the downlink (the wireless communication link from a base station to a terminal). OFDMA is highly robust against frequency selective fading and has a high affinity with MIMO (Multiple Input Multiple Output) transmission. As for a transmission scheme for the uplink (the wireless communication link from a terminal to a base station), on the other hand, the cost and scale of the terminal are important.

However, multi-carrier transmission, such as OFDMA or MC-CDMA (Multi-Carrier Code Division Multiple Access), requires a terminal to include a power amplifier having a wide linear region because of a high PAPR (Peak to Average Power Ratio) of the transmit signal, which thus makes multi-carrier transmission unsuitable for the uplink transmission. That is, to maintain a wide coverage (which is a communication coverage range, for example, the distance to a base station) in the uplink, single-carrier transmission is desirable in which the PAPR is low. For the uplink, LTE adopts SC-FDMA (Single Carrier Frequency Division Multiple Access, also referred to as DFT-S-OFDM), which is single-carrier transmission.

Also, methods for achieving a wide coverage include transmit antenna diversity (also referred to as "transmit diversity"). In transmit diversity, in the case of the uplink for example, signals that have undergone different kinds of signal processing are transmitted from multiple antennas of a transmission apparatus (which indicates a transmission unit of a terminal in this case) and are received by a receive antenna of a reception apparatus (which indicates a reception unit of a base station in this case). In this manner, transmit antenna diversity gain can be obtained. Transmit diversity is roughly categorized into open-loop transmit diversity, in which transmission is performed without using channel state information regarding channels between the transmission apparatus and the reception apparatus; and closed-loop transmit diversity, in which transmission processing is performed based on channel state information regarding channels between the transmission apparatus and the reception apparatus.

Open-loop transmit diversity includes STBC (Space Time Block Coding), SFBC (Space Frequency Block Coding), and CDD (Cyclic Delay Diversity). Closed-loop transmit diversity includes antenna selection transmit diversity and maximum ratio transmit receive antenna diversity. It has been decided that the uplink of LTE-A that uses this closed-loop transmit diversity adopts precoding based on codebooks (code tables) described in NPL 1. In precoding, phases of transmit signals of individual transmit antennas are rotated before transmission so that the signals transmitted from the multiple transmit antennas of a transmission apparatus are received to be combined in phase by a reception apparatus. In this manner, the reception power can be increased at the reception apparatus.

Furthermore, multiple antennas of a transmission apparatus in a wireless communication system are used not only to improve the communication quality through transmit diversity but also to achieve spatial multiplexing transmission, which can improve the transmission rate by transmitting independent signals from the individual antennas at the same time on the same frequency. In spatial multiplexing transmission, the number of simultaneously transmit signals is called the number of streams, the number of ranks, or the number of layers. The signals transmitted from individual antennas are demultiplexed through signal demultiplexing processing, such as spatial filtering or MLD (Maximum Likelihood Detection). Also, PTL 1 and PTL 2 disclose methods for performing transmission by making different frequency allocation (also referred to as "assignment" or "mapping") for each transmit antenna because the frequency with a good channel characteristic differs for each transmit antenna. By allowing the use of different frequency allocation for each transmit antenna, frequencies with high gain can be selected for each transmit antenna to perform communication. Thus, spatial multiplexing transmission with a high reception quality can be performed.

CITATION LIST

Patent Document

[Patent Document 1] Japanese Unexamined Patent Application Publication No. 2008-199598
[Patent Document 2] International Publication No. 2009/022709

Non-Patent Document

[Non-Patent Document 1] 3GPP TR 36.814 V9.0.0

DISCLOSURE OF INVENTION

Problems to be Solved by the Invention

In PTL 1 and PTL 2, different frequency allocation for each transmit antenna of a transmission apparatus is permitted. However, transmission of the same data from the transmit antennas are not permitted. Thus, the transmit antennas are unable to be used to improve the reception quality through transmit diversity. Each embodiment of the present invention is to address this point.

Means for Solving the Problems (1) The present invention is made to address the above-described issue, and a communication apparatus according to the invention includes a plurality of mapping units to which a plurality of data signal sequences related to the same data signal sequence are input and which arrange the input data signal sequences on the frequency axis and output the arranged data signal sequences as transmission frequency spectra, at least one of the plurality of data signal sequences being input via a spectra cyclic shift unit; an assignment information acquisition unit that controls the plurality of mapping units based on assignment information to cause the data signal sequences arranged on the frequency axis to partially overlap; an amount-of-cyclic-shift decision unit that decides an amount of cyclic shift based on control of the assignment information acquisition unit; the spectra cyclic shift unit shifting, under control of the amount-of-cyclic-shift decision unit, the at least one input data signal sequence by the amount of cyclic shift to cause partially overlapping data signals to be identical and outputting the at least one data signal sequence; and a plurality of transmit antennas that send out, at a radio frequency, the transmission frequency spectra output by the plurality of mapping units.

(2) Also, a communication apparatus according to the invention is the communication apparatus described above in which all the plurality of data signal sequences are input to the mapping units via the spectra cyclic shift units.

(3) Additionally, a communication apparatus according to the invention is the communication apparatus described above that further includes a precoding unit that changes amplitudes, phases, or both amplitudes and phases of data signals of data signal sequences and that inputs the data signal sequences directly to the mapping units or inputs the data signal sequences to the mapping units via the spectra cyclic shift units.

(4) Furthermore, a communication apparatus according to the invention is the communication apparatus described above in which the spectra cyclic shift unit performs a cyclic shift by using, as a reference, the arrangement of spectra for a specific transmit antenna among the plurality of transmit antennas.

(5) Moreover, a communication apparatus according to the invention is the communication apparatus described above in which the spectra cyclic shift unit performs a cyclic shift by using, as a reference, the index of a transmission frequency spectrum.

(6) The present invention is made to address the above-described issue, and a communication system according to the invention includes the communication apparatus according to (1) or (2) above; and a second communication apparatus including one or more receive antennas, and an equalization unit that performs, for each of transmission frequency spectra fed from the one or more receive antennas, equalization by using a SIMO weight for a case without interference. Data signals are transmitted and received between the first communication apparatus and the second communication apparatus.

(7) The present invention is made to address the above-described issue, and a communication method according to the invention includes preparing a plurality of data signal sequences related to the same data signal sequence; changing amplitudes, phases, or both amplitudes and phases of data signals of each of the plurality of data signal sequences; applying cyclic shifts to the plurality of changed data signal sequences; arranging the plurality of cyclically shifted data signal sequences on the frequency axis so that the plurality of data signal sequences partially overlap and overlapping data signals are identical; and sending out, at a radio frequency, a plurality of sets of transmission frequency spectra obtained by the arrangement on the frequency axis from a plurality of transmit antennas.

(8) The present invention is made to address the above-described issue, and a communication method according to the invention includes allocating a sequence of a plurality of data signals to a plurality of first transmission subcarriers in specific symbols; allocating a sequence of data signals that are the same as the plurality of data signals to a plurality of second transmission subcarriers in the specific symbols so that the plurality of first transmission subcarriers and the plurality of second transmission subcarriers partially overlap; applying a cyclic shift to the sequence of the plurality of data signals allocated to the plurality of first transmission subcarriers, the sequence of the plurality of data signals allocated to the plurality of second transmission subcarriers, or both the sequences so that the same data signal is allocated to each of a plurality of subcarriers where the first transmission subcarriers and the second transmission subcarriers partially overlap; and then transmitting the sequence of the plurality of data signals allocated to the first transmission subcarriers from a first transmit antenna and transmitting the sequence of the plurality of data signals allocated to the second transmission subcarriers from a second transmit antenna.

(9) Also, a communication method according to the invention is the communication method described above in which the first transmit antenna and the second transmit antenna are included in a single transmission apparatus.

(10) Additionally, a communication method according to the invention is the communication method described above in which the first transmit antenna is included in one transmission apparatus, and the second transmit antenna is included in another transmission apparatus.

(11) Furthermore, a communication method according to the invention is the communication method described above in which precoding for changing amplitudes, phases, or both amplitudes and phases is applied to the plurality of data signals.

(12) The present invention is made to address the above-described issue, and a communication apparatus according to the invention includes a plurality of mapping units that arrange a plurality of data signal sequences related to the same data signal sequence on the frequency axis and output the arranged data signal sequences as transmission frequency spectra; an assignment information acquisition unit that controls the plurality of mapping units based on assignment information to cause the arrangements of the data signal sequences on the frequency axis to be identical, to be separated, or to partially overlap; and a plurality of transmit antennas that send out, at a radio frequency, the transmission frequency spectra output by the plurality of mapping units.

(13) The present invention is made to address the above-described issue, and a communication apparatus according to the invention includes one or more receive antennas; and an equalization unit that performs, for each of transmission frequency spectra fed from the one or more receive antennas, equalization by using a SIMO weight for a case without interference and a MIMO weight for a case with interference.

(14) The present invention is made to address the above-described issue, and a communication system according to the invention includes the first communication apparatus according to (12) above; and the second communication apparatus according to (13) above, wherein data signals are transmitted and received between the first communication apparatus and the second communication apparatus.

(15) The present invention is made to address the above-described issue, and a communication method according to the invention includes preparing a plurality of data signal sequences related to the same data signal sequence; arranging the plurality of data signal sequences on the frequency axis to cause the plurality of data signal sequences to be identical, to be separated, or to partially overlap; and sending out, at a radio frequency, a plurality of sets of transmission frequency spectra obtained by the arrangement on the frequency axis from a plurality of transmit antennas.

(16) The present invention is made to address the above-described issue, and a communication method according to the invention includes receiving a plurality of transmission frequency spectra from one or more receive antennas; and performing, for each of the transmission frequency spectra, equalization by using a weight for a case without interference in a case without interference and by using a weight for a case with interference in a case with interference to restore the transmission frequency spectrum.

(17) The present invention is made to address the above-described issue, and a communication apparatus according to the invention includes a transmit diversity unit that applies coding onto a plurality of data signal sequences, the coding belonging to open-loop diversity that includes space time block coding, space frequency block coding, and cyclic delay diversity; a plurality of spectra cyclic shift units that cyclically shift the plurality of data signal sequences output by the transmit diversity unit; a plurality of mapping units that arrange the plurality of data signal sequences which are outputs of the plurality of spectra cyclic shift units on the frequency axis so that the plurality of data signal sequences partially overlap, and that output the arranged data signal sequences as transmission frequency spectra; and a plurality of transmit antennas that successively send out, at a radio frequency, the transmission frequency spectra output by the plurality of mapping units at two adjacent timings.

(18) Also, a communication apparatus according to the invention is the communication apparatus described above in which the plurality of data signal sequences output by the transmit diversity units are constituted by a first data signal sequence, a second data signal sequence, a third data signal sequence, and a fourth data signal sequence, the second signal sequence having signals that are complex conjugates of signals of the first signal sequence, the third data signal sequence being different from the first data signal sequence, the fourth data signal sequence having signals that are obtained by multiplying complex conjugates of signals of the third data signal sequence by the negative sign.

(19) The present invention is made to address the above-described issue, and a communication apparatus according to the invention includes a plurality of receive antennas; and an equalization unit that performs equalization on each of transmission frequency spectra fed from the receive antennas, the equalization unit including a weight calculation unit that calculates a weight used in equalization, a complex conjugation unit that selectively performs a complex conjugation operation, and a negative sign multiplication unit that selectively multiples the negative sign.

Effects of the Invention

According to the present invention, communication systems, communication apparatuses, and communication methods enable spatial transmission with a high reception quality to be performed.

BRIEF DESCRIPTION OF THE DRAWINGS

FIG. 3B is a diagram illustrating another example case where frequency assignment is separated between transmit antennas in the embodiment.

FIG. 3C is a diagram illustrating still another example case where frequency assignment for individual transmit antennas overlaps only partially in the embodiment.

FIG. 4 is a diagram illustrating an example of transmission frames in the embodiment.

FIG. 6 is a schematic block diagram of an equalization unit in the embodiment.

FIG. 7 is a diagram illustrating another example of frequency assignment in the embodiment.

FIG. 9 is a schematic block diagram illustrating a configuration of a terminal in the embodiment.

FIG. 11 is a flowchart that describes an operation of the spectra cyclic shift unit in the embodiment.

FIG. 12A is a diagram illustrating a specific example before a cyclic shift is performed in the case where frequency assignment partially overlaps between two transmit antennas in the embodiment.

FIG. 12B is a diagram illustrating a specific example of assignment at an overlapping part in the case where frequency assignment partially overlaps between two transmit antennas in the embodiment.

FIG. 13A is a diagram illustrating a specific example of assignment before a cyclic shift is performed in the case where frequency assignment partially overlaps between five transmit antennas in the embodiment.

FIG. 19B is a diagram that illustrates an example of the other of the frequency assignment pair and that describes assignment at an overlapping part in the embodiment.

BEST MODE FOR CARRYING OUT THE INVENTION

Figure 1:
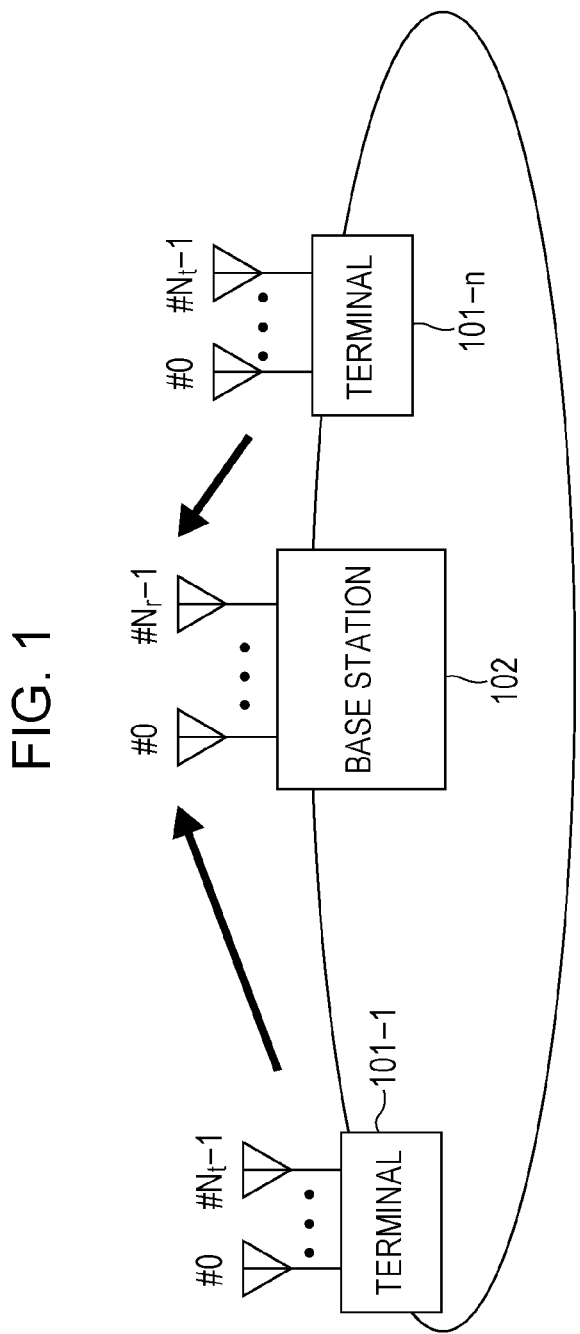
FIG. 1 is a schematic diagram of a communication system that performs transmit diversity of the present invention.

FIG. 1 is a schematic diagram of a communication system that performs transmit diversity.

The communication system in FIG. 1 includes a plurality of terminals 101-1, . . . , 101-$n$ and one base station 102. FIG. 1 illustrates only two terminals to make the figure easy-to-view. The terminals 101-1, . . . , 101-$n$ are collectively referred to as terminals 101.

Each terminal 101 includes multiple ($N_t$) transmit antennas #0 to #$N_t$-1. The base station 102 includes one or more ($N_r$) receive antennas #0 to #$N_r$-1.

The following description of embodiments of the present invention describes transmission of data using transmit diversity on the uplink from the terminal 101 to the base station 102. In the description, the terminal 101 may be referred to as a "transmission apparatus" or a "first communication apparatus", whereas the base station 102 may be referred to as a "reception apparatus" or a "second communication apparatus".

The following description describes transmission of the same spectra from all transmit antennas (this transmission is referred to as "rank-1" transmission). However, the number of ranks may be two or more as long as the transmission is transmission of the number of ranks that is smaller than the number of transmit antennas. Also, a case will be described in which one terminal 101 having multiple antennas performs communication on the uplink. However, a case of MU-MIMO (Multi-User MIMO) in which multiple terminals simultaneously make access on the same frequency may also be handled. In such a case, known frequency assignment and signal demultiplexing processing are additionally used. Also, in each embodiment, single-carrier transmission will be described as an example. However, multi-carrier transmission, such as OFDM or MC-CDMA, may also be adopted. Transmission on the uplink (the wireless communication link from the terminal 101 to the base station 102) will be described as an example. However, transmission on the downlink (the wireless communication link from the base station 102 to the terminal 101) may also be handled.

First Embodiment

Figure 2:
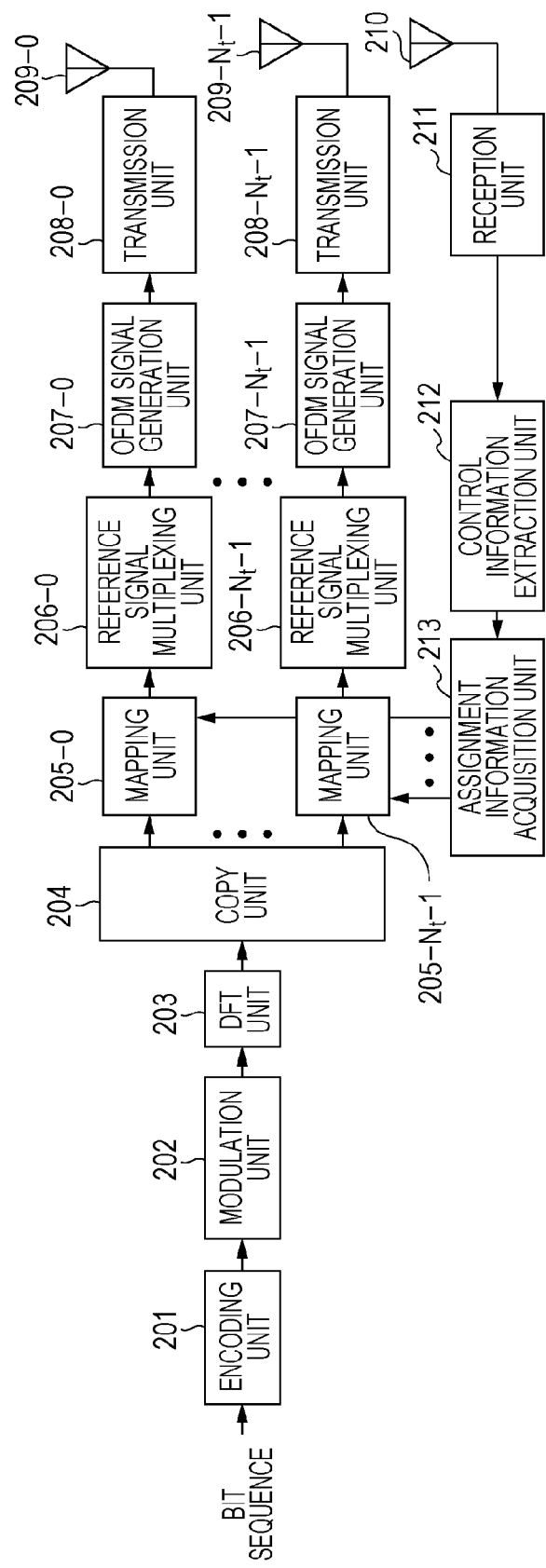
FIG. 2 is a schematic block diagram illustrating a configuration of a terminal in a first embodiment.

FIG. 2 is a schematic block diagram illustrating a configuration of the terminal 101 according to this embodiment.

The terminal 101 includes an encoding unit 201, a modulation unit 202, a DFT unit 203, a copy unit 204, mapping units 205-0 to 205-$N_t$-1, reference signal multiplexing units 206-0 to 206-$N_t$-1, OFDM signal generation units 207-0 to 207-$N_t$-1, transmission units 208-0 to 208-$N_t$-1, transmit antennas 209-0 to 209-$N_t$-1, a receive antenna 210, a reception unit 211, a control information extraction unit 212, and an assignment information acquisition unit 213.

The following describes a case of transmitting the same data by using the transmit antennas 209-0 to 209-$N_t$-1 of the terminal 101 through single-carrier transmission with identical, separated, or partially overlapping frequency assignment being used depending on a communication environment.

For ease of explanation, FIG. 2 omits other components that are known and included in the terminal 101. This also applies to other embodiments.

A bit sequence of data, such as audio data, character data, and image data, is encoded into error-corrected codes in the encoding unit 201. The error-corrected codes are then subjected to modulation, such as QPSK (Quadrature Phase Shift Keying) or 16QAM (Quadrature Amplitude Modulation), in the modulation unit 202 to be converted into modulation symbols. The $N_{DFT}$ output symbols of the modulation unit 202 are input to the DFT unit 203 at a time, and are converted from a time-domain signal to frequency-domain signals S(m) ($0 \leq m \leq N_{DFT}-1$) by means of an $N_{DFT}$-point discrete Fourier transform (DFT). Hereinafter, a data signal sequence of the output signals S(m) of this DFT unit 203 may be referred to as a "first set of transmission frequency spectra".

The outputs S(m) of the DFT unit 203 are input to the copy unit 204. The copy unit 204 makes as many copies of the input signals S(m) as the number of transmit antennas ($N_t$ transmit antennas), and inputs these copies to the mapping units 205-0 to 205-$N_t$-1.

Each of the mapping units 205-0 to 205-$N_t$-1 assigns transmission frequency spectra to $N_{DFT}$ certain frequency points among $N_{FFT}$ frequency points (which may be hereinafter referred to as "subcarriers"), where $N_{DFT} < N_{FFT}$. Spectra at $N_{FFT}$ frequency points may be referred to as a "second set of transmission frequency spectra".

Next, assignment performed in this mapping unit will be described.

The reception unit 211 receives, by using the receive antenna 210, a signal transmitted from the base station 102. The reception unit 211 performs downconversion from a carrier frequency to a baseband signal, A/D conversion, quadrature demodulation, and the fast Fourier transform; and then restores the transmitted signal. The reception unit 211 inputs this signal to the control information extraction unit 212. The control information extraction unit 212 extracts control information from the received signal, and inputs the control information to the assignment information acquisition unit 213.

The control information that is input to the assignment information acquisition unit 213 contains pieces of frequency assignment information for the individual transmit antennas 209-0 to 209-$N_t$-1. The assignment information acquisition unit 213 extracts pieces of assignment information for the individual transmit antennas 209-0 to 209-$N_t$-1 from the control information. The assignment information acquisition unit 213 inputs the pieces of assignment information to the corresponding mapping units 205-0 to 205-$N_t$-1 to control the mapping unit 205-0 to 205-$N_t$-1. Consequently, the first set of transmission frequency spectra is assigned to frequency points that are identical, are separated, or partially overlap between the individual transmit antennas 209-0 to 209-$N_t$-1.

Figure 3A:
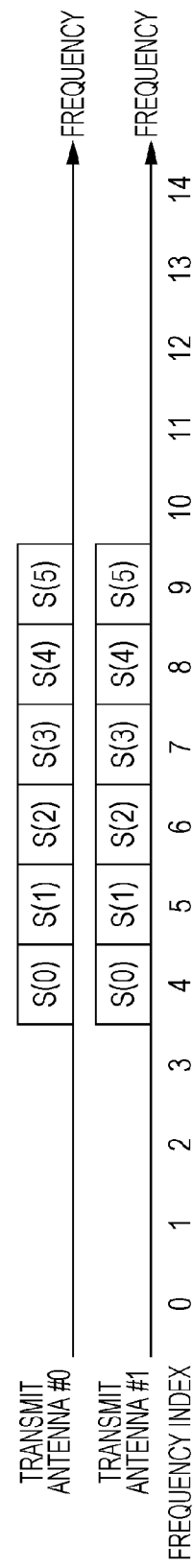
FIG. 3A is a diagram illustrating an example case where frequency assignment is identical between transmit antennas in the embodiment.

FIG. 3A to FIG. 3C illustrate examples of frequency assignment. Frequency assignment made for the individual transmit antennas 209-0 to 209-$N_t$-1 in this embodiment is roughly categorized into three patterns illustrated in FIG. 3A to FIG. 3C depending on the channel state (communication environment) between the terminal 101 and the base station 102.

For ease of explanation, FIG. 3A illustrates a case where the number of transmit antennas of the terminal 101 is two (This case corresponds to $N_t=2$, and the transmit antennas in this case are illustrated with references #0 and #1.) and identical frequency assignment is made for the transmit antennas #0 and #1. Specifically, this case includes a case where the first set of transmission frequency spectra S(0) to S(5) is contiguously assigned, for the transmit antennas #0 and #1, to frequency points with indices 4 to 9. Herein, the indices of frequency points may be referred to as frequency indices. FIG. 3B illustrates a case where separated frequency assignment is made for the transmit antennas #0 and #1. Specifically, this case includes a case where the first set of transmission frequency spectra S(0) to S(5) is contiguously assigned, for the transmit antenna #0, to frequency points with indices 1 to 6 and the first set of transmission frequency spectra S(0) to S(5) is also contiguously assigned, for the transmit antenna #1, to frequency indices 8 to 13.

FIG. 3C illustrates a case where frequency assignment for the transmit antenna #0 and frequency assignment for the transmit antenna #1 partially overlap. Specifically, this case includes a case where the transmission frequency spectra S(0) to S(5) are contiguously assigned, for the transmit antenna #0, to frequency indices 1 to 6, and the transmission frequency spectra S(0) to S(5) are also contiguously assigned, for the transmit antenna #1, to frequency indices 5 to 10. Consequently, frequency assignment overlaps one another at the frequency indices 5 and 6. In FIG. 3A to FIG. 3C, all the spectra at the frequency indices 0 to 14 constitute the second set of transmission frequency spectra after assignment.

While FIG. 3A to FIG. 3C illustrate examples in which the first set of transmission frequency spectra is contiguously assigned to multiple frequency points, the first set of transmission frequency spectra may be assigned non-contiguously.

As described above, this embodiment allows the first set of transmission frequency spectra to be unrestrainedly allocated to multiple frequency points for each of the transmit antennas 209-0 to 209-$N_t$-1, thus enabling flexible frequency assignment depending on the channel state. The mapping unit assigns zero to a frequency point to which no spectrum has been assigned.

The $N_{FFT}$-point outputs of each of the mapping units 205-0 to 205-$N_t$-1 are input to the corresponding one of the reference signal multiplexing units 206-0 to 206-$N_t$-1.

An SRS (Sounding Reference Signal) is used by the base station 102 to decide frequency points used by the terminal 101 for communication. A DMRS (DeModulation Reference Signal) is used by the base station 102 to perform channel compensation on the received signal. The reference signal multiplexing units 206-0 to 206-$N_t$-1 perform multiplexing of the SRS and the DMRS to ultimately generate transmission frames.

FIG. 4 illustrates an example of transmission frames in each of paths at the transmit antennas 209-0 to 209-$N_t$-1. These transmission frames are used by the transmit antennas 209-0 to 209-$N_t$-1 in common.

The vertical axis represents the index of an SC-FDMA symbol on the time axis, whereas the horizontal axis represents the index of a frequency point (This may be referred to as a "subcarrier". Also, this has the same meaning as a "resource element".) on the frequency axis.

One frame is constituted by 14 SC-FDMA symbols in total, i.e., zeroth to thirteenth SC-FDMA symbols. The demodulation reference signal DMRS is transmitted in the third and tenth SC-FDMA symbols (They are illustrated as black squares.) on the same frequency assignment as data signals. A data signal or the sounding reference signal SRS is transmitted in the last, i.e., thirteenth SC-FDMA symbol (It is illustrated as a hatched square). Which signal is to be sent is notified by the base station 102.

Unlike the DMRS, the SRS is not necessarily transmitted by using the same frequency as data signals. Specifically, the DMRS is a reference signal that is transmitted by the terminal 101 so as to allow the base station 102 to grasp the detailed channel states of a band on which the data spectra are transmitted. In contrast, the SRS is a reference signal that is transmitted by the terminal 101 so as to allow the base station 102 to grasp the rough channel quality of a system band.

The transmission frames generated by the reference signal multiplexing units 206-0 to 206-$N_t$'11 are input to the OFDM signal generation units 207-0 to 207-$N_t$'11, respectively.

The OFDM signal generation units 207-0 to 207-$N_t$-1 perform conversion from frequency-domain signals to time-domain signals by using an $N_{FFT}$-point IFFT (Inverse Fast Fourier Transform). Thereafter, the CP (Cyclic Prefix), which corresponds to the guard time, is inserted to each of the converted SC-FDMA symbols. The CP-inserted SC-FDMA symbols are then output to the transmission units 208-0 to 208-$N_t$-1.

The transmission units 207-0 to 207-$N_t$-1 subsequently perform on these symbols D/A (Digital-to-Analog) conversion, quadrature modulation, analog filtering, and upconversion from the baseband to the carrier frequency. Thereafter, the radio frequency signals carrying the CP-inserted SC-FDMA symbols are transmitted to the base station 102 from the transmit antennas 209-0 to 209-$N_t$-1.

The signals transmitted from the terminal 101 in the manner as described above are received by each of the $N_r$ receive antennas of the base station 102 via wireless channels.

Signal processing performed in the base station 102 will be described using FIG. 5.

Figure 5:
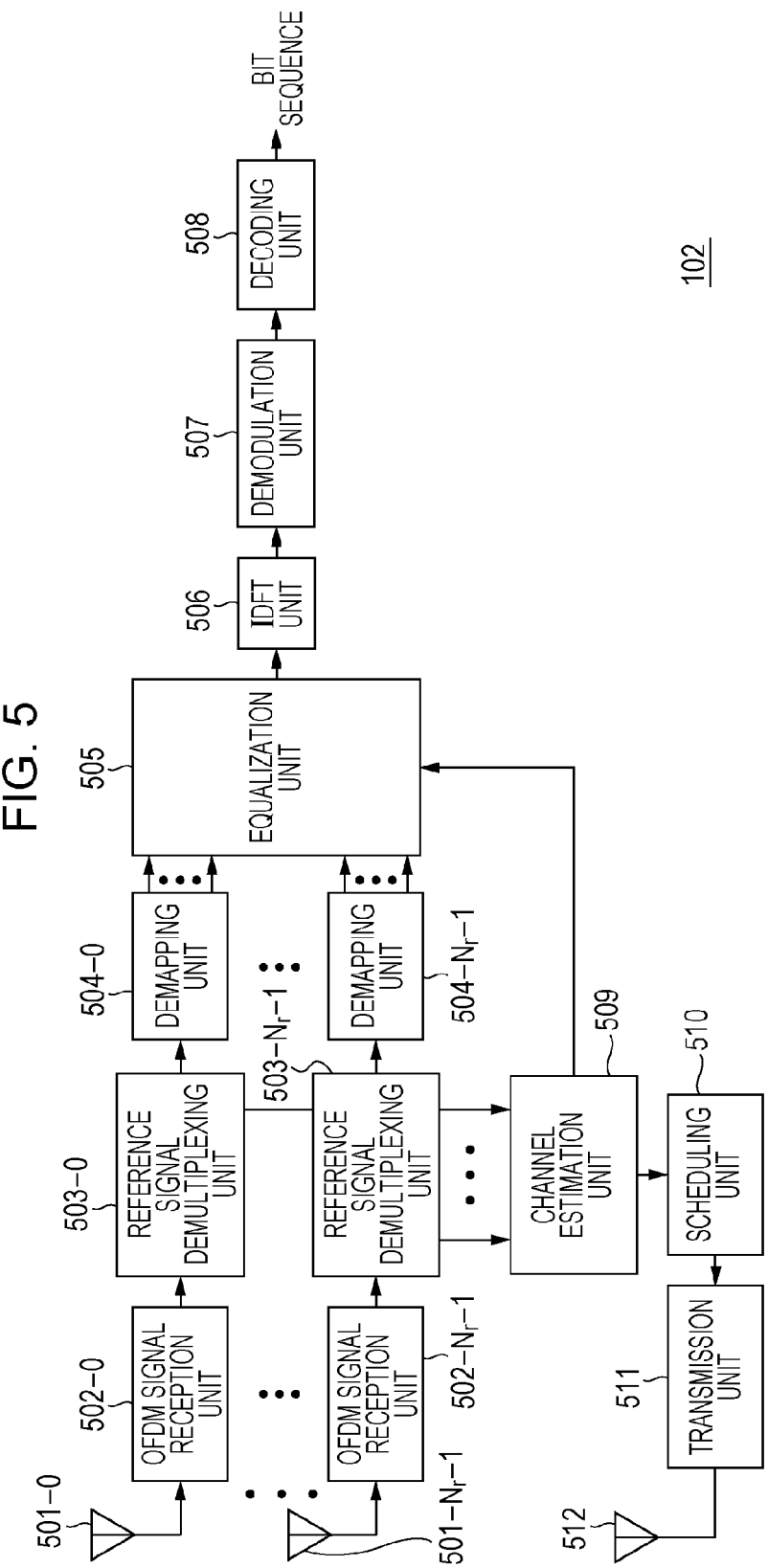
FIG. 5 is a schematic block diagram illustrating a configuration of a base station in the embodiment.

FIG. 5 is a schematic block diagram illustrating a configuration of the base station 102 of this embodiment.

The base station 102 includes receive antennas 501-0 to 501-$N_r$-1, OFDM signal reception units 502-0 to 502-$N_r$-1, reference signal demultiplexing units 503-0 to 503-$N_r$-1, demapping units 504-0 to 504-$N_r$-1, an equalization unit 505, an IDFT unit 506, a demodulation unit 507, a decoding unit 508, a channel estimation unit 509, a scheduling unit 510, a transmission unit 511, and a transmit antenna 512.

The following describes a case where signals transmitted from the terminal 101 through single-carrier transmission are received using the individual receive antennas 501-0 to 501-$N_r$-1 of the base station 102.

For ease of explanation, FIG. 5 omits other components that are known and included in the base station 102. This also applies to other embodiments.

Signals received by each of the $N_r$ receive antennas 501-0 to 501-$N_r$-1 of the base station are input to the corresponding OFDM signal reception units 502-0 to 502-$N_r$-1. Each of the OFDM signal reception units 502-0 to 502-$N_r$-1 performs downconversion from a carrier frequency to a baseband signal, analog filtering, A/D (Analog-to-Digital) conversion, and removal of the cyclic prefix CP from each SC-FDMA symbol. Then, each of the OFDM signal reception units 502-0 to 502-$N_r$-1 performs conversion from a time-domain signal to frequency-domain signals by using an $N_{FFT}$-point fast Fourier transform (FFT), and outputs $N_{FFT}$-point spectra to the corresponding one of the reference signal demultiplexing units 503-0 to 503-$N_r$-1.

The reference signal demultiplexing units 503-0 to 503-$N_r$-1 separate reference signals, such as the demodulation reference signal DMRS and the sounding reference signal SRS, from data signals. The reference signal demultiplexing units 503-0 to 503-$N_r$-1 input the reference signals to the channel estimation unit 509 and input the data signals to the corresponding demapping units 504-0 to 504-$N_r$-1.

By using the input demodulation reference signals DMRS, the channel estimation unit 509 estimates wireless channels (the phases and amplitudes of the propagation constants of the wireless channels) between individual transmit antennas of the terminal 101 and receive antennas of the base station 102 on a band on which the data signals have been transmitted. The obtained channel estimates are input to the equalization unit 505.

Also, by using the received sounding reference signals SRS, the channel estimation unit 509 estimates qualities of channels between the individual transmit antennas 209-0 to 209-$N_t$-1 of the terminal 101 and the receive antennas 501-0 to 501-$N_r$-1 of the base station 102 not only on the band on which the data signals are transmitted but also on the entire system band (estimates the channel qualities by using only the amplitude or power of the SRS). The channel quality estimates that are estimated by the channel estimation unit 509 for the entire system band are input to the scheduling unit 510.

Based on the input channel quality estimates, the scheduling unit 510 decides frequency assignment for each of the transmit antennas 209-0 to 209-$N_t$-1 of the terminal 101. In frequency assignment, frequency points (subcarriers) with high channel qualities are selected independently for each of the transmit antennas 209-0 to 209-$N_t$-1 of the terminal 101. Frequency assignment may be made with not only the channel qualities but also antenna correlations and frequency assignment of other mobile stations taken into consideration.

For example, FIG. 3A, FIG. 3B, and FIG. 3C described before illustrate examples in which six points from the frequency point with the highest gain are selected for each of the transmit antennas #0 and #1. Because the channel gain differs for each transmit antenna, frequency points are selected independently. Thus, separated frequencies may be assigned for the individual antennas as illustrated in FIG. 3B, frequencies may be assigned to overlap only partially as illustrated in FIG. 3C, or frequency assignment may be identical between the individual antennas as illustrated in FIG. 3A.

The data signals separated by the reference signal demultiplexing units 503-0 to 503-$N_r$-1 in FIG. 5 are input to the corresponding demapping units 504-0 to 504-$N_r$-1. From the input $N_{FFT}$-point received spectra, each of the demapping units 504-0 to 504-$N_r$-1 extracts received spectra of the data signals at frequency points used for transmission regarding the first set of transmission frequency spectra S(m).

For example, extraction of the transmission frequency spectrum S(1) in frequency assignment as illustrated in FIG. 3B is considered. Transmission of S(1) is performed using the second frequency point (with the frequency index 2) from the transmit antenna #0 of the terminal 101 and using the ninth frequency point (with the frequency point index 9) from the transmit antenna #1. Accordingly, each of the demapping units 504-0 to 504-$N_r$-1 (in this example, the demapping units 504-0 and 504-1) extracts data signals at the second and ninth frequency points, and then input these data signals to the equalization unit 505.

While only the transmission frequency spectrum S(1) has been described above, the similar processing is performed for the other transmission frequency spectra. Specifically, in the case where the number of transmission frequency spectra in the first set is $N_{DFT}$, the number of transmit antennas of the terminal 101 is $N_t$, and further different frequency assignment is made for every antenna, $N_{DFT} \times N_t$ values are input to the equalization unit. The input values alter depending on the number of assignment patterns. In the case where identical frequency assignment is made among all transmit antennas (in the case of FIG. 3A), $N_{DFT} \times 1$ values are input to the equalization unit 505.

In addition, the similar processing is also performed in the case of partially overlapping assignment as illustrated in FIG. 3C. In the case of extracting the transmission frequency spectrum S(1), data signals at the second and sixth frequency points are extracted and input to the equalization unit 505. At the second frequency point, the transmission frequency spectrum S(1) is receivable without interference unless another terminal transmits a data signal by using the second frequency point. At the sixth frequency point, however, the transmission frequency spectrum S(5) transmitted from the transmit antenna #0 causes interference. Accordingly, the equalization unit 505 performs processing of suppressing interference caused by the transmission frequency spectrum S(5) on the transmission frequency spectrum S(1). This will be described in detail below.

FIG. 6 is a block diagram illustrating the details of the equalization unit 505. The equalization unit 505 includes a combining unit 601, a weight multiplication unit 602, a channel matrix generation unit 603, a SIMO weight calculation unit 604, and a MIMO weight calculation unit 605.

To the equalization unit 505, $N_{DFT} \times N_t$ values are input from the demapping unit 504-0. Similarly, $N_{DFT} \times N_t$ values are also input from the last demapping unit 504-$N_r$-1. Accordingly, $N_{DFT} \times N_t \times N_r$ values in total are input to the equalization unit 505 from the demapping units 504-0 to 504-$N_r$-1.

Next, processing performed by the equalization unit 505 of the base station 102 in the case of frequency assignment of FIG. 3C (in the partially overlapping case) will be described.

The equalization unit 505 performs equalization independently for each transmission frequency spectrum S(m).

An example of performing equalization of the transmission frequency spectrum S(1) will be described as an example.

Let $R_n(k)$ denote a received signal received at a k-th frequency point (with the frequency index k) by an n-th receive antenna among the $N_r$ receive antennas of the base station 102. Then, $R_n(2)$ and $R_n(6)$ are expressed by the following expression 1.

$$\begin{cases} R_n(2) = H_{n,0}(2)S(1) \\ R_n(6) = H_{n,0}(6)S(5) + H_{n,1}(6)S(1) \end{cases} \quad \text{[Math. 1]}$$

Here, $H_{n,l}(k)$ denotes a channel gain at the k-th frequency point between an l-th transmit antenna of the terminal 101 and the n-th receive antenna of the base station 102. In the expression 1, noise at the receiver, interference from other cells, etc. are ignored.

Because the transmission frequency spectrum S(1) is received at two frequency points, namely, the second frequency point and the sixth frequency point, it can be considered that the transmission frequency spectrum S(1) is received with receive antennas, the number of which is doubled.

Thus, the combining unit 601 in the equalization unit 505 combines spectra at the individual receive frequency points to generate an $N_r N_t \times 1$ vector $R_{S(1)}$ (with $N_r N_t$ rows and one column). In this example case, the vector $R_{S(1)}$ that is input to the weight multiplication unit 602 by the combining unit 601 is expressed by the following expression 2.

$$R_{S(1)} = \begin{bmatrix} R_0(2) \\ \vdots \\ R_{Nr-1}(2) \\ R_0(6) \\ \vdots \\ R_{Nr-1}(6) \end{bmatrix} = \begin{bmatrix} H_{0,0}(2)S(1) \\ \vdots \\ H_{Nr-1,0}(2)S(1) \\ H_{0,0}(6)S(5) + H_{0,1}(6)S(1) \\ \vdots \\ H_{Nr-1,0}(6)S(5) + H_{Nr-1,1}(6)S(1) \end{bmatrix} \quad \text{[Math. 2]}$$

With an assumption that at the second frequency point for the transmit antenna #0 of the terminal 101, a channel gain of the interfering signal S(5) is zero, the above expression can be further modified in the following manner.

$$R_{S(1)} = \begin{bmatrix} H_{0,0}(2) & 0 \\ \vdots & \vdots \\ H_{Nr-1,0}(2) & 0 \\ H_{0,1}(6) & H_{0,0}(6) \\ \vdots & \vdots \\ H_{Nr-1,1}(6) & H_{Nr-1,0}(6) \end{bmatrix} \begin{bmatrix} S(1) \\ S(5) \end{bmatrix} \quad \text{[Math. 3]}$$

$$= H_{S(1)} \begin{bmatrix} S(1) \\ S(5) \end{bmatrix}$$

To the channel matrix generation unit 603 in FIG. 6, information that is necessary for the channel estimates input from the channel estimation unit 509 to constitute a matrix $H_{S(1)}$ of the expression 3 is input from the combining unit 601.

If the obtained estimated channel matrix is a matrix, i.e., if there is interference, the channel matrix generation unit 603 inputs the estimate of $H_{S(1)}$ to the MIMO weight calculation unit 605. On the other hand, if the obtained estimated channel matrix is actually a vector or scalar, i.e., if there is no interference, the channel matrix generation unit 603 inputs the estimate of $H_{S(1)}$ to the SIMO weight calculation unit 604.

In the expression 3, $H_{S(1)}$ is a $2N_r \times 2$ matrix (a matrix with $2N_r$ rows and two columns). Thus, the estimate of $H_{S(1)}$ is input to the MIMO weight calculation unit 605.

To perform equalization of the transmission frequency spectrum S(1), the MIMO weight calculation unit 605 calculates a MIMO weight vector $w_{S(1)}$, which is to be multiplied by the received spectrum vector of the expression 3. The weight vector $w_{S(1)}$ is expressed by the following expression 4.

$$\begin{bmatrix} w_{S(1)} \\ w_1 \end{bmatrix} = (H_{S(1)}^H H_{S(1)} + \sigma^2 I)^{-1} H_{S(1)}^H \quad \text{[Math. 4]}$$

This means that the right side of the expression 4 is calculated to extract a $1 \times 2N_r$ row vector $w_{S(1)}$ that is needed in equalization of S(1). Here, $\sigma^2$ denotes the average noise power, whereas I is the 2×2 identity matrix because the signal vector is a 2×1 vector in the expression 3. Equalization of S(5) can be performed using a weight $w_1$, which is not used in equalization of S(1). Also, T represents matrix (vector) transpose processing, H represents Hermitian transpose processing, and −1 represents the inverse matrix operation.

Specifically, by using the estimate of the channel matrix $H_{S(1)}$ input from the channel matrix generation unit 603 and the estimate of the average noise power input from a noise estimation unit not illustrated, the MIMO weight calculation unit 605 performs a calculation of the expression 4, which involves the inverse matrix operation, so as to find the weight vector $w_{S(1)}$. The MIMO weight calculation unit 605 then inputs the weight vector $w_{S(1)}$ to the weight multiplication unit 602.

A result obtained by subtracting a product of the channel estimate at each frequency obtained using the demodulation reference signal DMRS and the frequency-domain DMRS from a received signal of the frequency-domain DMRS represents noise. Thus, as an example, noise is estimated by determining, for each frequency, a square of the absolute value of the subtraction result, and then averaging out the squares.

While the expression 4 expresses an MMSE (Minimum Mean Square Error) weight as an example, a weight based on any criteria, such as a ZF (Zero Forcing) weight in which the average noise power is not taken into consideration or an MRC (Maximum Ratio Combining) weight, is usable. Furthermore, other signal demultiplexing methods, such as iterative equalization processing and MLD (Maximum Likelihood Detection), are also usable.

As described above, in the case where there is interference at any one of a plurality of frequency points at which the same spectrum has been transmitted (In the above-described example, S(1) is transmitted at the second and sixth frequency points.), a MIMO weight in which interference is taken into consideration is generated (In the above-described example, S(5) causes interference at the sixth frequency point.), whereby transmit diversity gain can be obtained effectively.

The weight multiplication unit 602 multiplies $R_{S(1)}$ which is input from the combining unit 601 by $w_{S(1)}$ which is input from the MIMO weight calculation unit 604 or the SIMO weight calculation unit 605 to find $$\tilde{S}(1) \quad \text{[Math. 5]}$$

which is an equalized output. This equalized output is expressed by the following expression.

$$\tilde{S}(1) = w_{S(1)} R_{S(1)} \quad \text{[Math. 6]}$$

The above is the description of the equalization processing of the transmission frequency spectrum S(1) performed in the equalization unit 505.

Next, a description will be given of equalization processing of a spectrum, such as the transmission frequency spectrum S(3) of FIG. 3C, for which no interference is caused by the other antenna of the terminal 101 at a frequency point at which the spectrum has been transmitted.

Received signals $R_n(4)$ and $R_n(8)$ received by the n-th receive antenna of the base station 102 at the fourth and eighth frequency points at which the transmission frequency spectrum S(3) has been transmitted from the terminal 101 are expressed by the following expression 7.

$$\begin{cases} R_n(4) = H_{n,0}(4)S(3) \\ R_n(8) = H_{n,1}(8)S(3) \end{cases} \quad \text{[Math. 7]}$$

Here, $H_{n,l}(k)$ denotes a channel gain at the k-th frequency point between the l-th transmit antenna of the terminal 101 and the n-th receive antenna of the base station 102. In the expression 7, noise is ignored.

Because the transmission frequency spectrum S(3) is received at the fourth frequency point and the eighth frequency point, it can be considered that the transmission frequency spectrum S(3) is received with receive antennas, the number of which is doubled. Thus, the combining unit 601 in the equalization unit 505 combines spectra at the individual receive frequency points to generate an $N_r N_t \times 1$ vector $R_{S(3)}$.

In this example case, the vector $R_{S(3)}$ that is input to the weight multiplication unit 602 by the combining unit 601 is expressed by the following expression.

$$R_{S(3)} = \begin{bmatrix} R_0(4) \\ \vdots \\ R_{Nr-1}(4) \\ R_0(8) \\ \vdots \\ R_{Nr-1}(8) \end{bmatrix} = \begin{bmatrix} H_{0,0}(4)S(3) \\ \vdots \\ H_{Nr-1,0}(4)S(3) \\ H_{0,1}(8)S(3) \\ \vdots \\ H_{Nr-1,1}(8)S(3) \end{bmatrix}$$  [Math. 8]

The above expression can be further modified in the following manner.

$$R_{S(3)} = \begin{bmatrix} H_{0,0}(4) \\ \vdots \\ H_{Nr-1,0}(4) \\ H_{0,1}(8) \\ \vdots \\ H_{Nr-1,1}(8) \end{bmatrix} S(3)$$  [Math. 9]

$$= H_{S(3)}S(3)$$

To the channel matrix generation unit 603, information that is necessary for the channel estimates input from the channel estimation unit 509 to constitute a matrix $H_{S(3)}$ (which is actually a vector) in the expression 9 is input from the combining unit 601. The channel matrix generation unit 603 generates an estimated matrix of $H_{s(3)}$ in the expression 9 by using the input channel estimates. Here, because $H_{S(3)}$ is a $2N_r \times 1$ vector in the expression 9, the estimate of $H_{S(3)}$ is input to the SIMO weight calculation unit 604.

To perform equalization of the transmission frequency spectrum S(3), the SIMO weight calculation unit 604 calculates a SIMO weight vector $w_{S(3)}$, which is to be multiplied by the received spectrum received by the n-th receive antenna at the k-th frequency point. In general, the weight vector $w_{S(3)}$ is expressed by the following expression 10.

$$w_{S(3)} = (H_{S(3)}^H H_{S(3)} + \sigma^2)^{-1} H_{S(3)}^H$$  [Math. 10]

$$= \frac{1}{\sum_{n=0}^{Nr-1}|H_{n,0}(4)|^2 + \sum_{n=0}^{Nr-1}|H_{n,1}(8)|^2 + \sigma^2} H_{S(3)}^H$$

Here, $\sigma^2$ denotes the average noise power.

Specifically, by using the estimate of the channel matrix $H_{S(3)}$ input from the channel matrix generation unit 603 and the estimate of the average noise power input from a noise estimation unit not illustrated, the weight calculation unit 602 calculates the weight vector $w_{S(3)}$ based on the expression 10, which involves no inverse matrix operation. The weight calculation unit 602 inputs the weight vector $w_{S(3)}$ to the weight multiplication unit 602. As in the above-described case of the transmission frequency spectrum S(1), the weight vector is not limited to an MMSE weight.

As described above, in the case where there is no interference at all frequency points among a plurality of frequency points on which the same spectrum has been transmitted (In the above-described example, S(3) is transmitted at the fourth and eighth frequency points.), a weight that involves no inverse matrix operation is generated, whereby transmit diversity gain can be obtained efficiently.

Accordingly, if there is an interfering transmitted signal, the equalization unit 505 in this embodiment calculates a weight by using the MIMO weight calculation unit 605 in which an inverse matrix operation involves. If there is no interfering transmitted signal, the equalization unit 505 calculates a weight by using the SIMO weight calculation unit 604 in which no inverse matrix operation involves. This makes it possible to perform appropriate signal demultiplexing while suppressing an increase in the amount of calculation.

The weight multiplication unit 602 multiplies the vector $R_{S(3)}$ which is input from the combining unit 601 by the weight vector $w_{S(3)}$ to find $$\tilde{S}(3)$$  [Math. 11]

which is the equalized transmission frequency spectrum. This equalized transmission frequency spectrum is expressed by the following expression.

$$\tilde{S}(3) = w_{S(3)} R_{S(3)}$$  [Math. 12]

The above is the description of the equalization processing of S(1) and S(3) performed in the equalization unit 505.

The equalization unit 505 performs the equalization processing on all the transmission frequency spectra S(m) ($0 \leq m \leq N_{DFT}-1$), and inputs the equalized spectra to the IDFT unit 506.

The equalization processing of S(3), which is a spectrum that is not subjected to interference from the other antenna in FIG. 3C, has been described above. In the case of frequency assignment illustrated in FIG. 3B, there is no interfering transmit signal. Thus, as in the above case of the transmission frequency spectrum S(3), the equalization processing using the SIMO weight calculation unit 604 is performed on all the frequency spectra.

The case of performing transmission from two transmit antennas of the terminal 101 has been described above. The case where the number of antennas is three or more will be described next.

FIG. 7 illustrates an example of frequency assignment in the case where the number of transmit antennas of the terminal 101 is five. Specifically, for a transmit antenna #0, transmission frequency spectra S(0) to S(5) are contiguously assigned to frequency indices 8 to 13, respectively. For a transmit antenna #1, the transmission frequency spectra S(0) to S(5) are contiguously assigned to frequency indices 3 to 8, respectively. For a transmit antenna #2, the transmission frequency spectra S(0) to S(5) are contiguously assigned to frequency indices 1 to 6, respectively. For a transmit antenna #3, the transmission frequency spectra S(0) to S(5) are contiguously assigned to frequency indices 6 to 11, respectively. For a transmit antenna #4, the transmission frequency spectra S(0) to S(5) are contiguously assigned to frequency indices 15 to 20, respectively.

The equalization unit 505 performs the equalization processing on all the spectra S(m) ($0 \leq m \leq N_{DFT}-1$). The following describes an example of the transmission frequency spectrum S(0).

Let $R_n(k)$ denote a received signal received at a k-th frequency point by n-th reception of the base station 102. Then, received signals at the first, third, sixth, eighth, and fifteenth frequency points at which the transmission frequency spectrum S(0) has been transmitted are expressed by the following expression 13.

$$\begin{cases} R_n(1) = H_{n,2}(1)S(0) \\ R_n(3) = H_{n,1}(3)S(0) + H_{n,2}(3)S(2) \\ R_n(6) = H_{n,1}(6)S(3) + H_{n,2}(6)S(5) + H_{n,3}(6)S(0) \\ R_n(8) = H_{n,0}(8)S(0) + H_{n,1}(8)S(5) + H_{n,3}(8)S(2) \\ R_n(15) = H_{n,4}(15)S(0) \end{cases}$$ [Math. 13]

Here, $H_{n,l}(k)$ denotes a channel gain at the k-th frequency point (with the frequency point index k) between an l-th transmit antenna and an n-th receive antenna. In the expression 13, noise is ignored. Because S(0) is received at five frequency points, it can be considered that S(0) is received with receive antenna, the number of which is quintupled. Thus, the combining unit 601 in the equalization unit 505 in FIG. 6 combines spectra at the individual receive frequencies to generate an $N_rN_r \times 1$ vector $R_{S(0)}$. The vector $R_{S(0)}$ that is input to the weight multiplication unit by the combining unit is expressed by the following expression 14.

$$R_{S(0)} = \begin{bmatrix} R_0(1) \\ \vdots \\ R_{Nr-1}(1) \\ R_0(3) \\ \vdots \\ R_{Nr-1}(3) \\ R_0(6) \\ \vdots \\ R_{Nr-1}(6) \\ R_0(8) \\ \vdots \\ R_{Nr-1}(8) \\ R_0(15) \\ \vdots \\ R_{Nr-1}(15) \end{bmatrix}$$ [Math. 14]

$$= \begin{bmatrix} H_{0,2}(1)S(0) \\ \vdots \\ H_{Nr-1,2}(1)S(0) \\ H_{0,1}(3)S(0) + H_{0,2}(3)S(2) \\ \vdots \\ H_{Nr-1,1}(3)S(0) + H_{Nr-1,2}(3)S(2) \\ H_{0,1}(6)S(3) + H_{0,2}(6)S(5) + H_{0,3}(6)S(0) \\ \vdots \\ H_{Nr-1,1}(6)S(3) + H_{Nr-1,2}(6)S(5) + H_{Nr-1,3}(6)S(0) \\ H_{0,0}(8)S(0) + H_{0,1}(8)S(5) + H_{0,3}(8)S(2) \\ \vdots \\ H_{Nr-1,0}(8)S(0) + H_{Nr-1,1}(8)S(5) + H_{Nr-1,3}(8)S(2) \\ H_{0,4}(15)S(0) \\ \vdots \\ H_{Nr-1,4}(15)S(0) \end{bmatrix}$$

$$= \begin{bmatrix} H_{0,2}(1) & 0 & 0 & 0 \\ \vdots & \vdots & \vdots & \vdots \\ H_{Nr-1,2}(1) & 0 & 0 & 0 \\ H_{0,1}(3) & H_{0,2}(3) & 0 & 0 \\ \vdots & \vdots & \vdots & \vdots \\ H_{Nr-1,1}(3) & H_{Nr-1,2}(3) & 0 & 0 \\ H_{0,3}(6) & 0 & H_{0,1}(6) & H_{0,2}(6) \\ \vdots & \vdots & \vdots & \vdots \\ H_{Nr-1,3}(6) & 0 & H_{Nr-1,1}(6) & H_{Nr-1,2}(6) \\ H_{0,0}(8) & H_{0,3}(8) & 0 & H_{0,1}(8) \\ \vdots & \vdots & \vdots & \vdots \\ H_{Nr-1,0}(8) & H_{Nr-1,3}(8) & 0 & H_{Nr-1,1}(8) \\ H_{0,4}(15) & 0 & 0 & 0 \\ \vdots & \vdots & \vdots & \vdots \\ H_{Nr-1,4}(15) & 0 & 0 & 0 \end{bmatrix} \begin{bmatrix} S(0) \\ S(2) \\ S(3) \\ S(5) \end{bmatrix}$$

$$= H_{S(0)} \begin{bmatrix} S(0) \\ S(2) \\ S(3) \\ S(5) \end{bmatrix}$$

Because $H_{S(0)}$ is a $5N_r \times 4$ matrix in the expression 14, the channel matrix generation unit 603 inputs the estimate of $H_{S(0)}$ to the MIMO weight calculation unit 605, which generates an MMSE weight as in the above-described case of the expression 4.

Because the signal vector is a 4×1 vector (with four rows and one column) in the expression 14, I in the above-described expression 4 is the 4×4 identity matrix. Specifically, the MIMO weight calculation unit 605 performs the following processing.

The MIMO weight calculation unit 605 (1) extracts all frequencies on which the spectrum of interest has been received, (2) combines received signals at the individual frequencies to generate a received signal column vector, (3) generates a transmitted signal column vector constituted by spectra on any of the frequencies, (4) calculates a channel matrix that satisfies "received signal column vector=channel matrix×transmitted signal column vector", and (5) selects the MIMO weight calculation unit 605 or the SIMO weight calculation unit 604 depending on whether or not the channel matrix is a matrix, i.e., depending on whether or not there is interference from another antenna.

By performing such processing, the equalization processing can be performed also in the case where the terminal 101 includes three or more transmit antennas.

To avoid an increase in the amount of calculation that results from performing a large inverse matrix operation on all the transmission frequency spectra, a configuration may be adopted in which spectra are combined after demultiplexing is performed on each frequency.

For example, in the case of the expression 14, when the first and fifteenth frequency points alone are focused on, equalization can be performed by using the SIMO weight calculation 604 without performing the inverse matrix operation. Next, the third and eighth frequency points are focused on and equalization is then performed by performing a 3×3 inverse matrix operation. Lastly, the sixth frequency point is focused on and equalization is performed by performing a 3×3 inverse matrix operation. Then, the three outputs are combined using MMSE. In this manner, a 4×4 inverse matrix operation can be avoided. Also, if equalization can be performed accurately by using the first and fifteenth frequency points alone in the case of the expression 14, the third, sixth, and eighth frequency points need not be used in the equalization processing in order to reduce the amount of calculation.

The output of the weight multiplication unit 602 is input, as the output of the equalization unit 505, to the IDFT unit 506 illustrated in FIG. 5, the IDFT unit 506 performs an $N_{DFT}$-point IDFT (Inverse Discrete Fourier Transform) on the input equalized transmission frequency spectra S(m) ($0 \leq m \leq N_{DFT}-1$) so as to perform conversion from frequency-domain signals to a time-domain signal. The output of the IDFT unit 506 is input to the demodulation unit 507, which then performs conversion from a symbol format to a bit format based on the modulation scheme carried out in the terminal 101.

The signal converted into bits is input to the decoding unit 508, undergoes error correction decoding, and then is output to the outside as data of a bit sequence.

As described above, in the case where the terminal 101 having multiple transmit antennas transmits the same data signal from the individual transmit antennas, this embodiment does not restrict the transmission to transmission using the same frequency points (subcarriers) but permits transmission using different frequency points for individual antennas. Consequently, transmission can be performed using frequency points with high channel gains for individual transmit antennas of the terminal 101, resulting in an improvement in the received power at the base station 102. In addition, because signals transmitted from the individual transmit antennas of the terminal 101 are received at multiple frequency points at the base station 102, good transmission performances can be obtained by combining the signals on the frequencies in the equalization unit 505 of the base station 102.

This embodiment has shown the case of forming the second set of transmission frequency spectra by contiguously assigning the first set of transmission frequency spectra in a manner as illustrated in FIGS. 3A to C and FIG. 7. However, the embodiment is also applicable to the case where the first set of transmission frequency spectra is assigned non-contiguously. Also, because single-carrier transmission is used in this embodiment, a weight is generated while taking into account that spectra transmitted on different frequencies are combined within the equalization unit as in the expression 4 or expression 11. However, instead of single-carrier transmission, another transmission scheme, such as OFDM, may be used. For example, in the case of OFDM, because individual frequencies (subcarriers) are not associated through the DFT, a weight is usable in which the channel states at the other frequencies are not considered.

Second Embodiment

In the first embodiment, signal demultiplexing needs to be performed using spatial filtering in which an MMSE weight or the like is multiplied or MLD (Maximum Likelihood Detection) because different transmission frequency spectra are transmitted at the same frequency point.

However, to perform spatial filtering, it is desirable that the base station (receiver) have (the number of interfering signals +1) or more receive antennas, causing an issue that the scale of the base station becomes larger.

Performing MLD or iterative processing in the base station can largely reduce interference but it causes an issue that the circuit scale and the signal processing delay increase. Furthermore, it is extremely difficult to completely remove interference with any signal demultiplexing methods and residual interference degrades performances without exception.

Accordingly, as a second embodiment, transmit diversity will be described in which transmission processing is performed so as not to cause interference at the base station.

A description will be given below, in which the terminal and the base station of this embodiment are assigned references 101a and 102a, respectively.

Figure 8A:
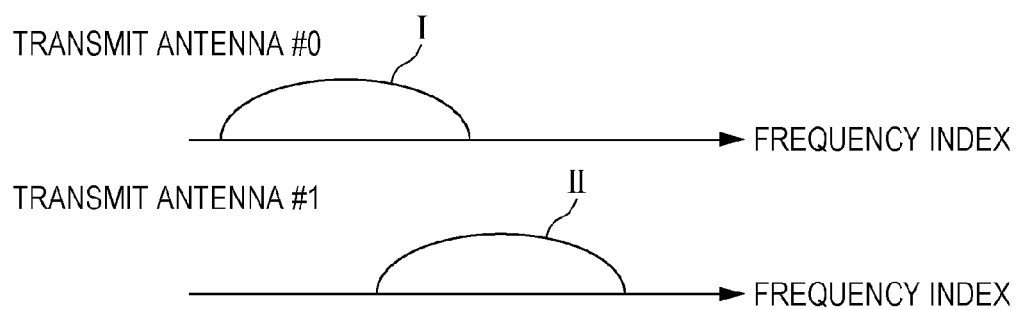
FIG. 8A is a conceptual diagram illustrating an example before a cyclic shift is performed in the case where frequency assignment for two transmit antennas partially overlaps in a second embodiment.
Figure 8B:
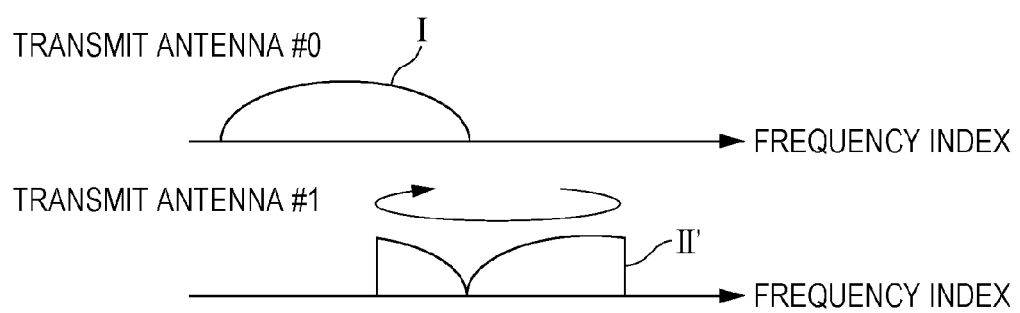
FIG. 8B is a conceptual diagram illustrating an example after a cyclic shift is performed in the case where frequency assignment for two transmit antennas partially overlaps in the second embodiment.

FIG. 8A and FIG. 8B illustrate conceptual diagrams of an example in which the number of transmit antennas $N_t$ of the terminal 101a is two and frequency points used by the individual transmit antennas for transmission partially overlap.

When spectra are assigned to data signals sequentially from a lower frequency to a higher frequency for individual transmit antennas as illustrated in FIG. 8A, the ending part of a plurality of transmission frequency spectra I to be transmitted from a zeroth antenna (transmit antenna #0) and the beginning part of a plurality of transmission frequency spectra II to be transmitted from a first transmit antenna (transmit antenna #1) are transmitted at the same frequency points, causing interference. Accordingly, as illustrated in FIG. 8B, for the first transmit antenna, the transmission frequency spectra are cyclically shifted within the assigned frequency points. A result of applying the cyclic shift corresponds to transmission frequency spectra II'. Frequency spectra are identical at frequency points at which assignment for the zeroth transmit antenna overlaps assignment for the first transmit antenna. The transmission frequency spectra I and II' are transmitted from the zeroth transmit antenna and the first transmit antenna, respectively.

Accordingly, in this embodiment, a cyclic shift is applied to transmission frequency spectra within assigned frequency points before transmission so as not to cause interference at a receive antenna.

FIG. 9 is a schematic block diagram illustrating a configuration of the terminal 101a of this embodiment.

The terminal 101a includes an encoding unit 901, a modulation unit 902, a DFT unit 903, a precoding unit 904, spectra cyclic shift units 905-0 to 905-$N_t$-1, mapping units 906-0 to 906-$N_t$-1, reference signal multiplexing units 907-0 to 907-$N_t$-1, OFDM signal generation units 908-0 to 908-$N_t$-1, transmission units 909-0 to 909-$N_t$-1, transmit antennas 910-0 to 910-$N_t$-1, a receive antenna 911, a reception unit 912, a control information extraction unit 913, an assignment information acquisition unit 914, a PMI acquisition unit 915, and an amount-of-cyclic-shift decision unit 916.

The following describes the case of transmitting the same data by using the transmit antennas 910-0 to 910-$N_t$-1 of the terminal 101a through single-carrier transmission with different frequency assignment.

A bit sequence of data, such as audio data, character data, and image data, is encoded into error-corrected codes in the encoding unit 901. The error-corrected codes are then subjected to modulation, such as QPSK or 16QAM, in the modulation unit 902 to be converted into modulation symbols. The $N_{DFT}$ output symbols of the modulation unit 902 are input to the DFT unit 903 at a time, and are converted from a time-domain signal to frequency spectra by means of an $N_{DFT}$-point discrete Fourier transform.

The outputs S(m) ($0 \leq m \leq N_{DFT}-1$) of the DFT unit 903 are input to the precoding unit 904.

In the first embodiment, the outputs of the DFT unit 203 (FIG. 2) are input to the copy unit 204 (FIG. 2), whereas in this embodiment, they are input to the precoding unit 904. This is because, in the case where the same transmission frequency spectrum is transmitted at the same frequency point from the zeroth transmit antenna (transmit antenna #0) and the first transmit antenna (transmit antenna #1) as illustrated in FIG. 8B, signals from the individual transmit antennas of the terminal 101a are possibly received at the base station 102a to cancel each other out depending on the channel states. Accordingly, in this embodiment, precoding that allows signals from individual transmit antennas are combined in phase at a received antenna is performed on a first set of frequency spectrum signals, which is output signals of the DFT 903. The precoded signals are then output to the spectra cyclic shift units 905-0 to 905-N$_t$-1.

Accordingly, in this embodiment, a case will be described in which the terminal 101a does not include the copy unit but includes the precoding unit 904.

The precoding unit 904 performs precoding in accordance with precoding matrix information, which is obtained by the PMI acquisition unit 915.

Here, the PMI acquisition unit 915 extracts the PMI (Precoding Matrix Indicator) from control information that is input thereto from the control information extraction unit 913, and inputs the PMI to the precoding unit 904. The PMI is decided at the base station 102a in accordance with a channel between a transmit antenna and a receive antenna. Typically, the PMI that maximizes the received SINR (Signal to Interference plus Noise power Ratio), the received SNR (Signal to Noise power Ratio), or a channel capacity is selected. The terminal 101a is notified of this PMI.

The precoding unit 904 multiplies the first set of transmission frequency spectra S(m), which is input from the DFT unit 903, by corresponding precoding matrices w(m). Here, the precoding matrix w(m) for the number of ranks R is an $N_t \times R$ matrix. Because the number of ranks R is 1 in this embodiment, the precoding matrix w(m) is an $N_t \times 1$ matrix.

Vectors S(m) ($0 \leq m \leq N_{DFT}-1$) output by the precoding unit 904 are expressed by the following expression.

$$S(m) = w(m)S(m) \qquad \text{[Math. 15]}$$
$$= [S_0(m)\ S_1(m)\ \ldots\ S_{Nt-1}(m)]^T$$

While the precoding matrix w(m) depends on the frequency index m in the expression 15, the same precoding matrix w may be used for all frequency indices to suppress the amount of information notified by the base station 102a.

Also, to suppress the amount of notified information, the PMI may indicate the index of a quantized precoding matrix (written in codebooks (code tables)) instead of the precoding matrix itself. The base station 102a may notify the terminal 101a of this PMI.

The precoding matrix (a 2×1 matrix, i.e., a precoding vector) w for the number of ranks 1 (This is also referred to as the number of layers 1 or the number of streams 1.) with two transmit antennas is constituted by six vectors in Table 1 according to 3GPP. The base station 102a selects one from these codebook indices, and notifies the terminal 101a of the selected one as the PMI.

TABLE 1

| | Codebook Index | | | | | |
|---|---|---|---|---|---|---|
| | 0 | 1 | 2 | 3 | 4 | 5 |
| w | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | $\frac{1}{\sqrt{2}}\begin{bmatrix}1\\0\end{bmatrix}$ | $\frac{1}{\sqrt{2}}\begin{bmatrix}0\\1\end{bmatrix}$ |

Further, in the case of using the same precoding matrix for all spectrum indices, precoding may be performed in the time domain although precoding is performed in the frequency domain in the configuration of the terminal 101a in FIG. 9.

In the following description, it is assumed that the same precoding is performed for all spectrum indices by using an $N_t \times 1$ precoding vector w.

This embodiment assumes an FDD (Frequency Division Duplex) system, and assumes that the precoding vector used by the terminal 101a for transmission is notified by the base station 102a. However, in a TDD (Time Division Duplex) system, which uses the same frequency band for the uplink and the downlink, the terminal 101a can decide the precoding vector for the uplink by using a downlink reference signal. Thus, notification of the precoding vector (or codebook index) may be omitted. Also, instead of performing channel-adaptive precoding, precoding may be performed in a pattern that is decided in advance for transmission and reception.

The signals $S_n(m)$ for an n-th transmit antenna which are output from the precoding unit 904 in FIG. 9 are input to the spectra cyclic shift unit 905-n. Specifically, the signals $S_0(m)$ for the zeroth transmit antenna 910-0 are input to the spectra cyclic shift unit 905-0. Similarly, the signals $S_{Nt-1}(m)$ for the last, i.e., the $N_t$-1th, transmit antenna 910-$N_t$-1 are input to the spectra cyclic shift unit 905-$N_t$-1.

Figure 10:
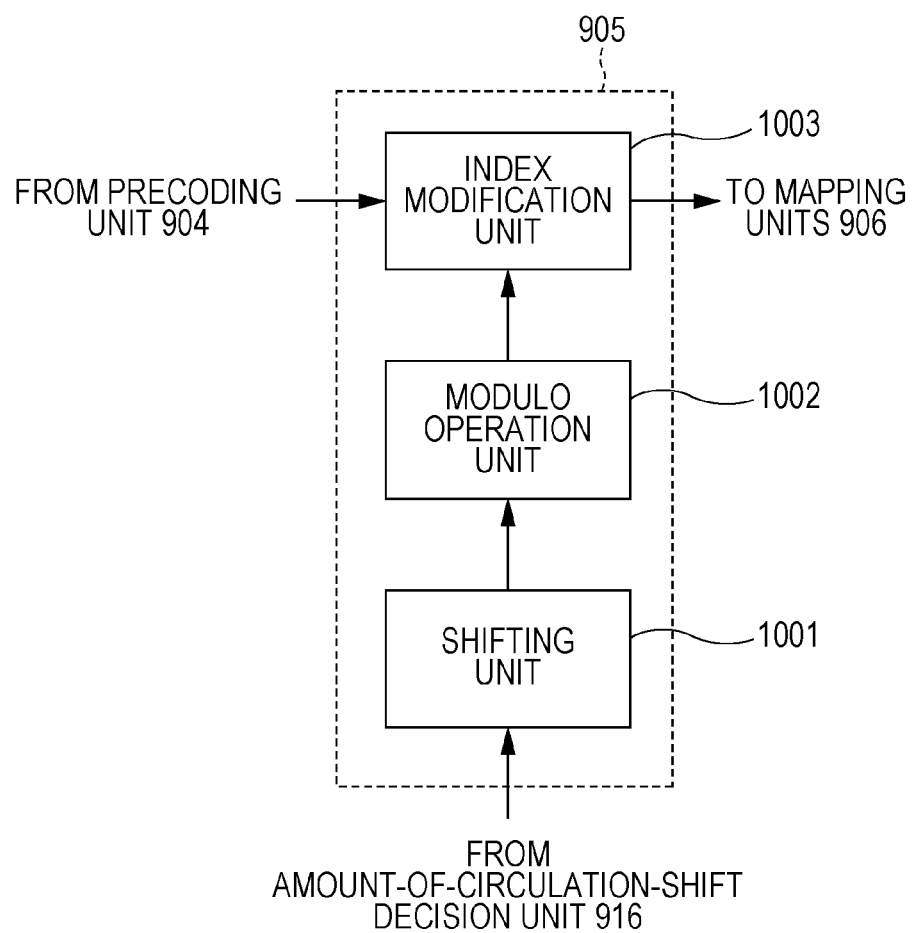
FIG. 10 is a schematic block diagram illustrating a configuration of a spectra cyclic shift unit in the embodiment.

FIG. 10 is a block diagram illustrating a specific configuration of the spectra cyclic shift unit 905. The $N_t$ spectra cyclic shift units 905-0 to 905-$N_t$-1 have the same configuration, and the common configuration thereof is assigned a reference 905.

The spectra cyclic shift unit 905 includes a shifting unit 1001, a modulo operation unit 1002, and an index modification unit 1003.

The amount of cyclic shift $\Delta_n$, which is input from the amount-of-cyclic-shift decision unit 916, is input to the shifting unit 1001. The amount-of-cyclic-shift decision unit 916 will be described later.

The shifting unit 1001 adds the amount of cyclic shift $\Delta_n$, which is input under control of the amount-of-cyclic-shift decision unit 916, to a sequence of $N_{DFT}$ values from 0 to $N_{DFT}-1$, and inputs the results to the modulo operation unit 1002. For example, in the case where $N_{DFT}=6$ and $\Delta_n=4$, a sequence of values 4, 5, 6, 7, 8, and 9, which is obtained by adding 4 to a sequence of values 0, 1, 2, 3, 4, and 5, is input to the modulo operation unit 1002. The modulo operation unit 1002 performs a modulo operation on the sequence that is input from the shifting unit 1001 by using $N_{DFT}=6$ (calculates the remainder of division by $N_{DFT}$), and inputs the results to the index modification unit 1003. For example, in the above example, the output of the modulo operation unit 1002 is a sequence of 4, 5, 0, 1, 2, and 3 because $N_{DFT}$ is equal to 6.

The index modification unit 1003 performs processing of modifying the frequency indices 0, 1, 2, 3, 4, and 5 of the precoded transmission frequency spectra that are input from the precoding unit 904 to the sequence 4, 5, 0, 1, 2, and 3 input from the modulo operation unit 1002.

In the above example, to the index modification unit 1003 of the spectra cyclic shift unit 905-n, the precoded transmission frequency spectra $S_n(0)$, $S_n(1)$, $S_n(2)$, $S_n(3)$, $S_n(4)$, and $S_n(5)$ are input from the precoding unit 904 and the frequency indices "4, 5, 0, 1, 2, and 3" are input from the modulo operation unit. The index modification unit outputs, as $S'_n(0)$, $S'_n(1)$, $S'_n(2)$, $S'_n(3)$, $S'_n(4)$, and $S'_n(5)$, the transmission frequency spectra $S_n(4)$, $S_n(5)$, $S_n(0)$, $S_n(1)$, $S_n(2)$, and $S_n(3)$ that are rearranged in accordance with the frequency indices.

FIG. 11 is a flowchart that describes an operation of the spectra cyclic shift unit 905-n.

First, the spectra cyclic shift unit 905-n generates a temporal sequence 0, 1, 2, . . . , and $N_{DFT}-1$ (step S1101). Next, the spectra cyclic shift unit 905-n increases the values of this sequence by the amount of cyclic shift $\Delta_n$ input from the amount-of-cyclic-shift decision unit 916 (step S1102). The spectra cyclic shift unit 905-n performs a modulo operation on this sequence of increased values by using the value $N_{DFT}$ (step S1103). Next, using the sequence resulting from this modulo operation, the spectra cyclic shift unit 905-n modifies the frequency indices of the first set of precoded transmission frequency spectra input from the above-described precoding unit 904 (step S1104). Subsequently, the spectra cyclic shift unit 905-n outputs the obtained transmission frequency spectra to the mapping units 906.

As described above, using the amount of cyclic shift $\Delta_n$ input from the amount-of-cyclic-shift decision unit 914, the spectra cyclic shift unit 905 performs a cyclic shift on the transmission frequency spectra $S_n(m)$ output by the precoding unit 904.

Let $S_n(m)$ denote a transmission frequency spectrum input to the spectra cyclic shift unit from the precoding unit 904 and let $\Delta_n$ denote the amount of cyclic shift. Then, the output $S'_n(m)$ of the spectra cyclic shift unit 905 is given by the following expression.

$$S'_n(m) = S_n((m+\Delta_n) \bmod N_{DFT}) \quad \text{[Math. 16]}$$

The spectra $S'_n(m)$, where $0 \le n \le N_t-1$, output by the spectra cyclic shift unit 905-n are input to the mapping unit 906-n of FIG. 9.

Signal processing performed in the mapping units 906-0 to 906-$N_t$-1 to the antenna 910-0 to 910-$N_t$-1 is the same as that in the first embodiment. Thus, the description thereof is incorporated. Note that the demodulation reference signal DMRS is multiplied by the precoding vector w before transmission just like data signals.

Now, signal processing performed in the spectra cyclic shift units 905-0 to 905-$N_t$-1 in FIG. 9 will be described.

Figure 12C:
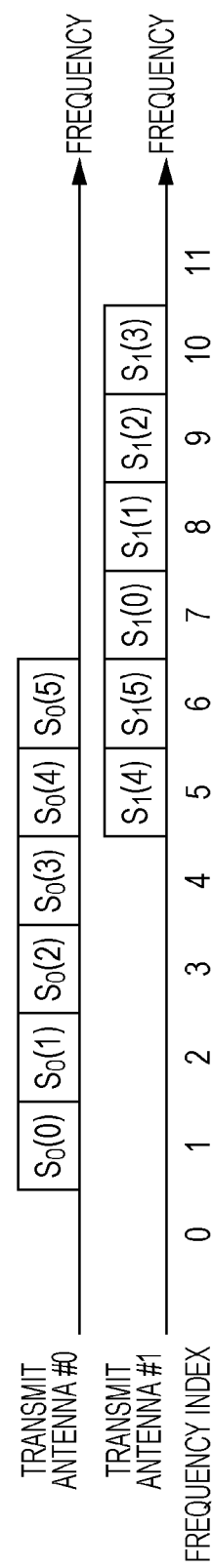
FIG. 12C is a diagram illustrating a specific example after a cyclic shift is performed in the case where frequency assignment partially overlaps between two transmit antennas in the embodiment.

FIG. 12A to FIG. 12C illustrate examples in which the number of transmit antennas $N_t$ is two, the number of DFT points $N_{DFT}$ is six, and frequency points used by the zeroth transmit antenna (transmit antenna #0) and the first transmit antenna (transmit antenna #1) for transmission partially overlap.

Specifically, in FIG. 12A, for the zeroth transmit antenna, a first set of transmission frequency spectra $S_0(0)$ to $S_0(5)$ is assigned to frequency points with indices 1 to 6, respectively. For the first transmit antenna, a first set of transmission frequency spectra $S_1(0)$ to $S_1(5)$ is assigned to the frequency points with indices 5 to 10, respectively.

When frequency spectra $S(m)$ ($0 \le m \le 5$) constituted by six spectra are assigned, for each antenna, sequentially from a lower frequency point to a higher frequency point as illustrated in FIG. 12A, for example at the fifth frequency point, the frequency spectrum $S_0(4)$ is transmitted from the zeroth transmit antenna and the transmission frequency spectrum $S_1(0)$ is transmitted from the first transmit antenna. Also, at the sixth frequency point, the frequency spectrum $S_0(5)$ is transmitted from the zeroth transmit antenna and the frequency spectrum $S_1(1)$ is transmitted from the first transmit antenna.

In the case where frequency points to be used differ between antennas, different spectra are transmitted from the individual transmit antennas at frequency points at which assignment partially overlaps one another, causing inter-antenna interference at the base station.

Accordingly, in this embodiment, the same transmission frequency spectrum is transmitted at an overlapping frequency point from the zeroth transmit antenna and the first transmit antenna. Specifically, as illustrated in FIG. 12B, at the fifth and sixth frequency points for the first transmit antenna, the transmission frequency spectra $S_1(4)$ and $S_1(5)$ are transmitted respectively, which are the same as the corresponding transmission frequency spectra of the zeroth transmit antenna.

The sub-indices of the transmission frequency spectra transmitted from the individual transmit antennas (the numeral subscripts for the transmission frequency spectra as in $S_0(4)$ and $S_1(4)$) differ from one another. However, the transmission frequency spectra $S_0(4)$ and $S_1(4)$ differ only in the phase because each is multiplied by the precoding vector was shown by the expression 15, and are originally the same spectrum $S(4)$. Also, interference does not occur because the precoding vector w is decided such that spectra transmitted from individual transmit antennas are to be combined in phase at the base station 102a.

Accordingly, when the same spectrum is transmitted from individual antennas at an overlapping frequency point, the base station 102a is able to receive signals transmitted from the terminal 101a without interference.

Now, in FIG. 12B, assignment to the seventh to tenth frequency points for the first transmit antenna is undone. Accordingly, as illustrated in FIG. 12C, the frequency spectra $S_1(0)$ to $S_1(3)$, which have not been assigned for the first transmit antenna, are assigned to the seventh to tenth frequency points, respectively.

By making assignment in this manner, spectra are transmitted from the first transmit antenna to the base station 102a with being contiguously assigned in an order of the frequency spectra $S_1(4)$, $S_1(5)$, $S_1(0)$, $S_1(1)$, $S_1(2)$, and $S_1(3)$. That is, as illustrated in FIG. 12C, the spectra transmitted from the first transmit antenna are spectra obtained by cyclically shifting the spectra that are transmitted from the zeroth antenna of FIG. 12A by the amount of cyclic shift $\Delta_1=4$.

In FIG. 12A to FIG. 12C, the case where the number of transmit antennas $N_t$ of the terminal 101a is two has been described. The case where the number of transmit antennas $N_t$ is more than two will be described using FIG. 13A and FIG. 13B.

Figure 13B:
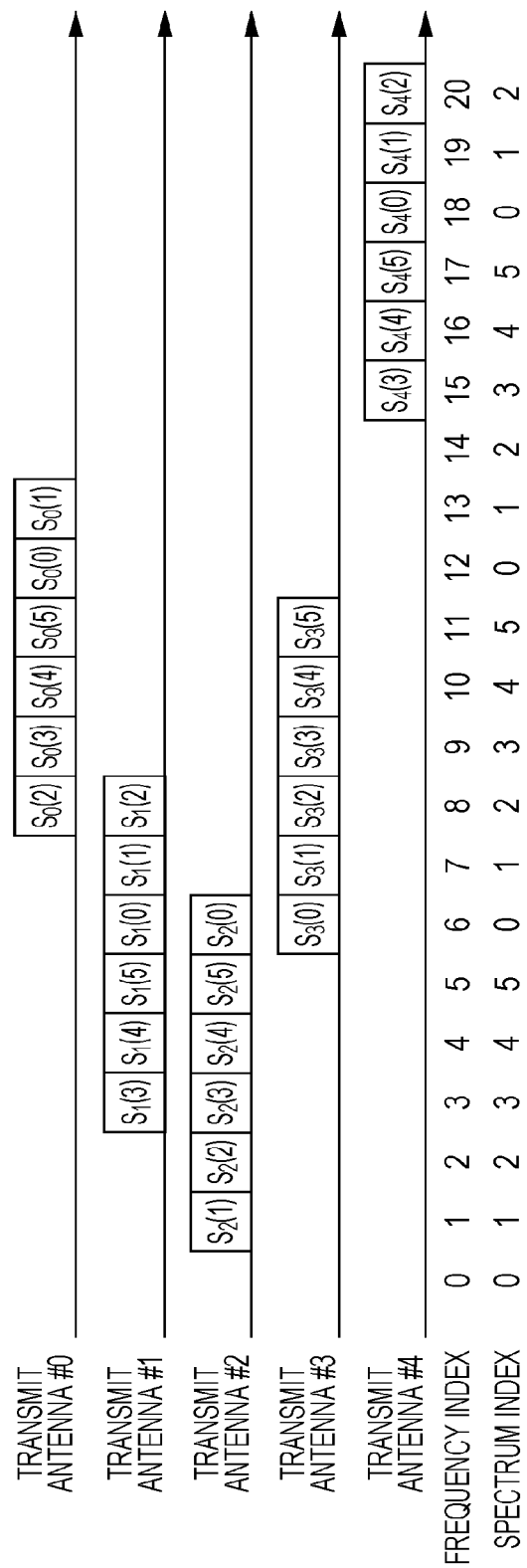
FIG. 13B is a diagram illustrating a specific example of assignment after a cyclic shift is performed in the case where frequency assignment partially overlaps between five transmit antennas in the embodiment.

FIG. 13A and FIG. 13B illustrate examples of transmit spectra in the case where the number of transmit antennas $N_t$ of the terminal 101a is five.

In FIG. 13A, for the zeroth transmit antenna (transmit antenna #0), transmission frequency spectra $S_0(0)$ to $S_0(5)$ are assigned to frequency points with indices 8 to 13, respectively. For the first transmit antenna (transmit antenna #1), transmission frequency spectra $S_1(0)$ to $S_1(5)$ are assigned to frequency points with indices 3 to 8, respectively. For the second transmit antenna (transmit antenna #2), transmission frequency spectra $S_2(0)$ to $S_2(5)$ are assigned to frequency points with indices 1 to 6, respectively. For the third transmit antenna (transmit antenna #3), transmission frequency spectra $S_3(0)$ to $S_3(5)$ are assigned to frequency points with indices 6 to 11, respectively. For the fourth transmit antenna (transmit antenna #4), transmission frequency spectra $S_4(0)$ to $S_4(5)$ are assigned to frequency points with indices 15 to 20, respectively.

FIG. 13A illustrates an example of the case where no cyclic shift is performed in the frequency domain. The indices of frequency points at which interference-free reception is achieved are 1, 2, 12, 13, and 15 to 20, whereas 0 and 14 are unused. At the other frequency indices, different transmission frequency spectra are transmitted from the transmit antennas #0 to #4. Accordingly, individual spectra need to be demultiplexed at the base station 102*a*.

FIG. 13B illustrates transmit spectra obtained when the above-described cyclic shift is applied to the transmit spectra of FIG. 13A. In FIG. 13B, the spectrum index i is defined using the frequency index k and the number of transmit spectrum points $N_{DFT}$ (six points in the illustrated example). Specifically, the spectrum index i is defined by the following expression.

$$i = k \bmod N_{DFT} \qquad \text{[Math. 17]}$$

That is, the spectrum index i is the remainder obtained when the frequency index k is divided by the value $N_{DFT}$.

As illustrated in FIG. 13B, the transmit antennas transmit the frequency spectra indicated by the spectrum indices, whereby the same transmit spectrum is transmitted from the transmit antennas at each frequency point. For example, frequency points with frequency indices 8, 9, 10, 11, 12, and 13 are assigned for the zeroth transmit antenna (transmit antenna #0). Because the frequency indices 8, 9, 10, 11, 12, and 13 respectively correspond to the spectrum indices 2, 3, 4, 5, 0, and 1, a cyclic shift is applied using the amount of cyclic shift $\Delta_0=2$. The cyclically shifted frequency spectra $S_0(2)$, $S_0(3)$, $S_0(4)$, $S_0(5)$, $S_0(0)$, and $S_0(1)$ are assigned to the frequency points with the indices 8, 9, 10, 11, 12, and 13, respectively.

While the spectrum index is defined relative to the frequency index in FIG. 13B, the spectrum index may be decided relative to a specific transmit antenna such that the amount of cyclic shift is zero, i.e., no cyclic shift is performed, in the spectra cyclic shift unit corresponding to the transmit antenna as illustrated in FIG. 12C. For example, in the example of FIG. 12C, control is performed relative to the zeroth transmit antenna such that no cyclic shift is performed (that is, the amount of cyclic shift $\Delta_0=0$) in the cyclic shift unit corresponding to the zeroth transmit antenna and a cyclic shift of the amount of cyclic shift $\Delta_1=4$ is performed in the cyclic shift unit corresponding to the first transmit antenna.

<Modification>

Figure 14:
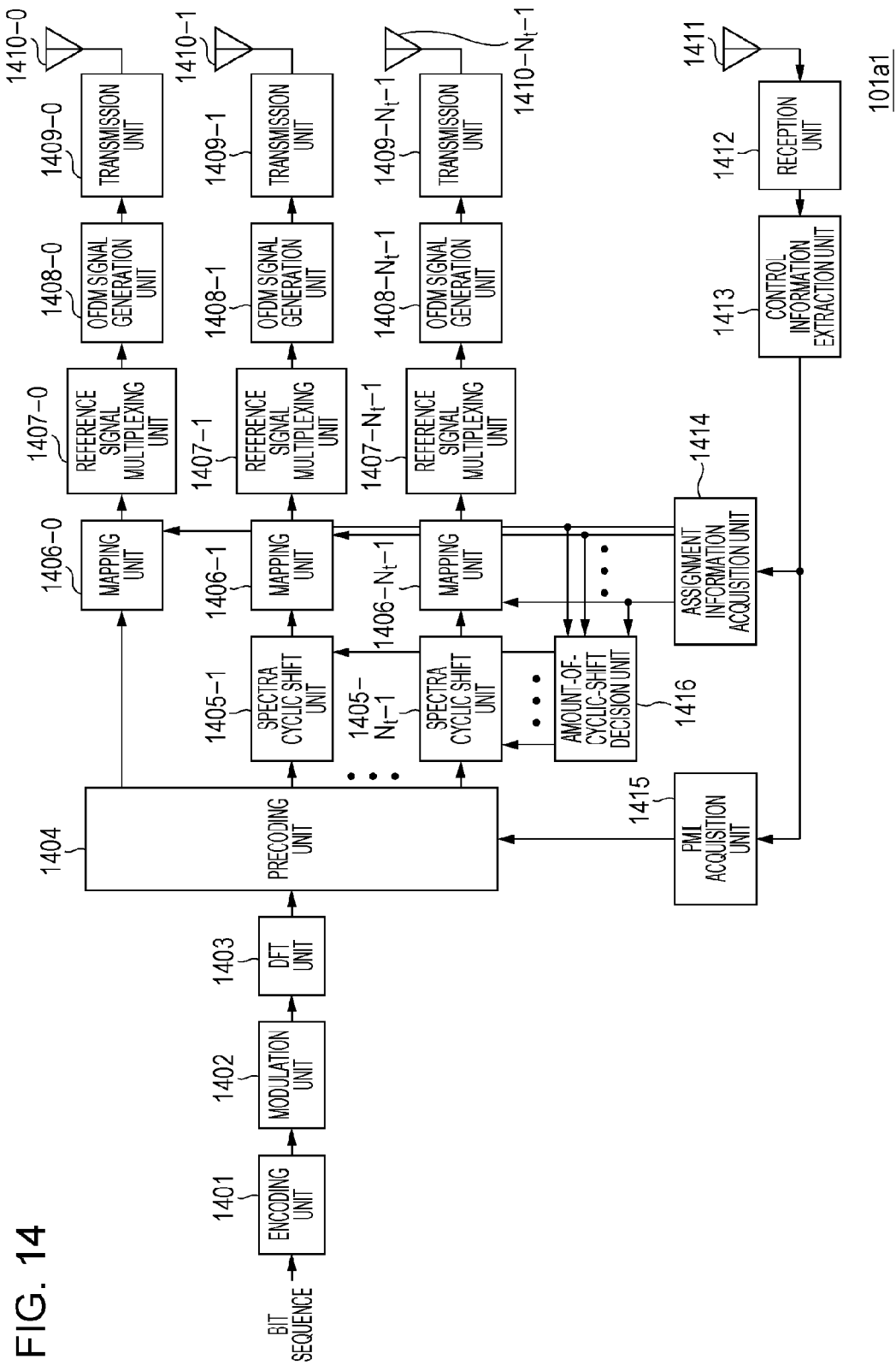
FIG. 14 is a schematic block diagram illustrating a modified configuration of the terminal in the embodiment.

As illustrated in FIG. 14, the configuration of the terminal 101*a* may be a configuration without a spectra cyclic shift unit for a certain transmit antenna.

FIG. 14 is a schematic block diagram illustrating a configuration of a terminal 101*a*1 which is a modification of this embodiment.

The terminal 101*a*1 includes an encoding unit 1401, a modulation unit 1402, a DFT unit 1403, a precoding unit 1404, spectra cyclic shift unit 1405-1 to 1405$N_t$−1, mapping units 1406-0 and 1406-1 to 1406-$N_t$−1, reference signal multiplexing units 1407-0 and 1407-1 to 1407-$N_t$−1, OFDM signal generation units 1408-0 and 1408-1 to 1408-$N_t$−1, transmission units 1409-0 and 1409-1 to 1409-$N_t$−1, transmit antennas 1410-0 and 1410-1 to 910-$N_t$−1, a receive antenna 1411, a reception unit 1412, a control information extraction unit 1413, an assignment information acquisition unit 1414, a PMI acquisition unit 1415, and an amount-of-cyclic-shift decision unit 1416.

When the configuration of the terminal 101*a*1 of FIG. 14 is compared with the configuration of the terminal 101*a* of FIG. 9, the former differs from the latter in that the former lacks the component equivalent to the spectra cyclic shift unit 905-0 of the latter and transmission frequency spectra which have been precoded by the precoding unit 904 are output directly to the mapping unit 1406-0 but there is no difference regarding the other components. This is because control is performed with reference to the zeroth transmit antenna such that no cyclic shift is performed in the cyclic shift unit corresponding to the zeroth transmit antenna. Because of this, the configuration of the terminal 101*b* is simplified in this modification.

Referring back to FIG. 13B, frequency assignment for the fourth transmit antenna (transmit antenna #4) in FIG. 13B does not overlap those of the other transmit antennas. If this is known at the transmission and reception sides, a spectrum-index-based cyclic shift need not be performed.

Figure 15:
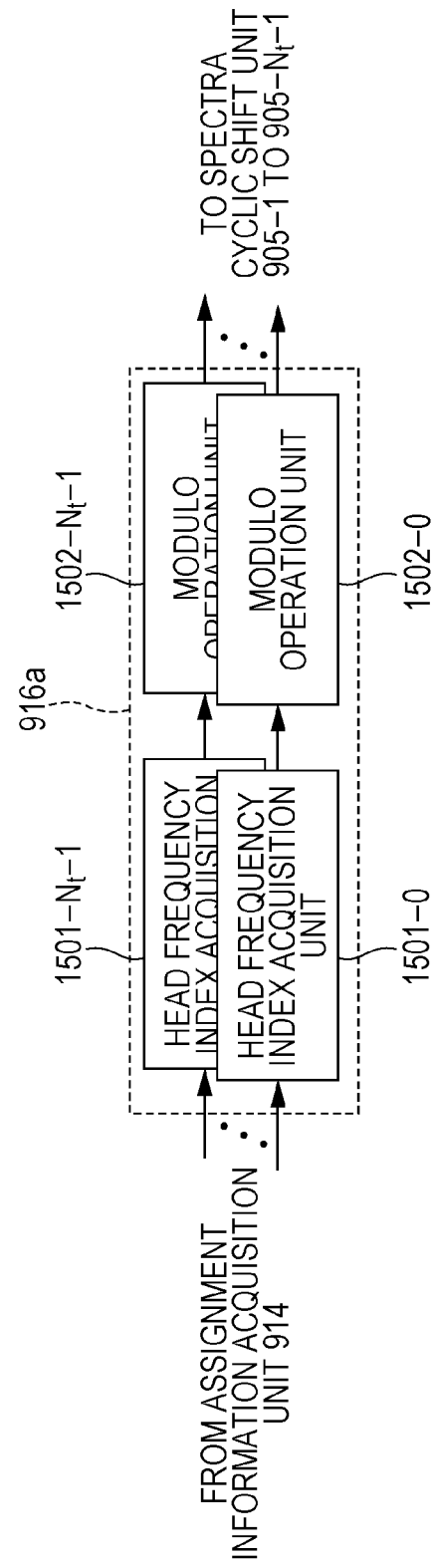
FIG. 15 is a schematic block diagram illustrating a configuration of an amount-of-cyclic-shift decision unit in the embodiment.

Next, using FIG. 15, a description will be given of an example of the configuration of the amount-of-cyclic-shift decision unit illustrated in FIG. 9 that decides the amount of cyclic shift for performing a spectra cyclic shift as illustrated in FIG. 13B. The amount-of-cyclic-shift decision unit described here is assigned a reference 916*a*.

Pieces of assignment information for respective transmit antennas are input to corresponding head frequency index acquisition units 1501-0 to 1501-$N_t$−1 in the amount-of-cyclic-shift decision unit 916*a*. The head frequency index acquisition units 1501-0 to 1501-$N_t$−1 acquire the head frequency index (for the lowest frequency) contained in the input assignment information.

For example, in the case of the third transmit antenna in FIG. 13A, the head frequency index acquisition unit 1501-3 outputs six as the head frequency index. Outputs of the head frequency index acquisition units 1501-0 to 1501-$N_t$−1 are input to modulo operation units 1502-0 to 1502-$N_t$−1, respectively. The modulo operation units 1502-0 to 1502-$N_t$−1 output the remainder obtained by dividing the input head frequency index by $N_{DFT}$. Let $k_{HEAD,n}$ denote the head frequency index input to the modulo operation unit 1502-$n$. Then, the amount of cyclic shift $\Delta_n$ output by the modulo operation unit 1502-$n$ is expressed by the following expression, where $0 \leq n \leq N_t-1$.

$$\Delta_n = k_{HEAD,n} \bmod N_{DFT} \qquad \text{[Math. 18]}$$

The output $\Delta_n$ is output from the amount-of-cyclic-shift decision unit 916*a* as the amount of cyclic shift used in the n-th spectra cyclic shift unit 905-$n$ of the terminal 101*a* illustrated in FIG. 9.

In this way, the amount-of-cyclic-shift decision unit 916*a* calculates the remainder obtained when the head frequency index in frequency assignment for each of the transmit antennas 910-0 to 910-$N_t$−1 of the terminal 101*a* is divided by $N_{DFT}$, thereby being able to decide the amount of cyclic shift.

In the above description, the head frequency index acquisition units 1501-0 to 1501-$N_t$−1 use the zeroth frequency point as the reference. However, the head frequency index relative to the head frequency index of a specific transmit antenna may be output as long as knowledge thereabout is available at the terminal 101*a* and the base station 102*a*.

For example, in FIG. 13A, when the zeroth transmit antenna is set as the reference, the head frequency index output by the head frequency index acquisition unit 1501-0 is 0 and the head frequency index output by the head frequency index acquisition unit 1501-1 is −5. In this case, the modulo operation unit 1502-1 outputs, because $$\Delta_1 = -5 \mod 6 \qquad \text{[Math. 19]}$$
$$= 1,$$

1 as the amount of cyclic shift $\Delta_1$. Then for the first transmit antenna (transmit antenna #1), transmission frequency spectra $S_1(1)$, $S_1(2)$, $S_1(3)$, $S_1(4)$, $S_1(5)$, and $S_1(0)$, which are the results of applying the amount of cyclic shift $\Delta_1=1$, are assigned to frequency points with indices 3 to 8, respectively.

Now, a time-domain signal waveform obtained by performing a cyclic shift on spectra will be described.

An inverse discrete Fourier transform (IDFT) of transmission frequency spectra $S(m)$ ($0 \leq m \leq N_{DFT}-1$) is given by the following expression.

$$s(t) = \frac{1}{N_{DFT}} \sum_{m=0}^{N_{DFT}-1} S(m) \exp(j2\pi mt/N_{DFT}) \qquad \text{[Math. 20]}$$

The IDFT output $s'(t)$ of the frequency spectra to which the amount of cyclic shift $\Delta_n$ is applied is given by the following expression.

$$s'(t) = \frac{1}{N_{DFT}} \sum_{m=0}^{N_{DFT}-1} S((m+\Delta_n) \mod N_{DFT}) \exp(j2\pi mt/N_{DFT}) \qquad \text{[Math. 21]}$$

Here, because the $N_{DFT}$-point IDFT satisfies, for a given integer m, $$S(m) = S(m \mod N_{DFT}), \qquad \text{[Math. 22]}$$

the expression 22 can be modified into the following expression.

$$\begin{aligned} s'(t) &= \frac{1}{N_{DFT}} \sum_{m=0}^{N_{DFT}-1} S(m+\Delta_n) \exp(j2\pi mt/N_{DFT}) \qquad \text{[Math. 23]} \\ &= \frac{1}{N_{DFT}} \sum_{m=0}^{N_{DFT}-1} S(m+\Delta_n) \exp(j2\pi (m+\Delta_n)t/N_{DFT}) \\ &\quad \exp(-j2\pi \Delta_n t/N_{DFT}) \\ &= \exp(-j2\pi \Delta_n t/N_{DFT}) s(t) \end{aligned}$$

Thus, the cyclic-shift-applied time-domain signal $s'(t)$ is a signal obtained by applying a phase rotation to a time-domain signal $s(t)$ to which no cyclic shift is applied. Even if a phase rotation is applied, the peak to average power ratio PAPR of the transmit signal is maintained low. That is, even if a cyclic shift is applied, the statistical properties of the transmit signal do not change. Thus, a load imposed on the power amplifier used in a transmission unit of the terminal 101*a* does not become too high.

Figure 16:
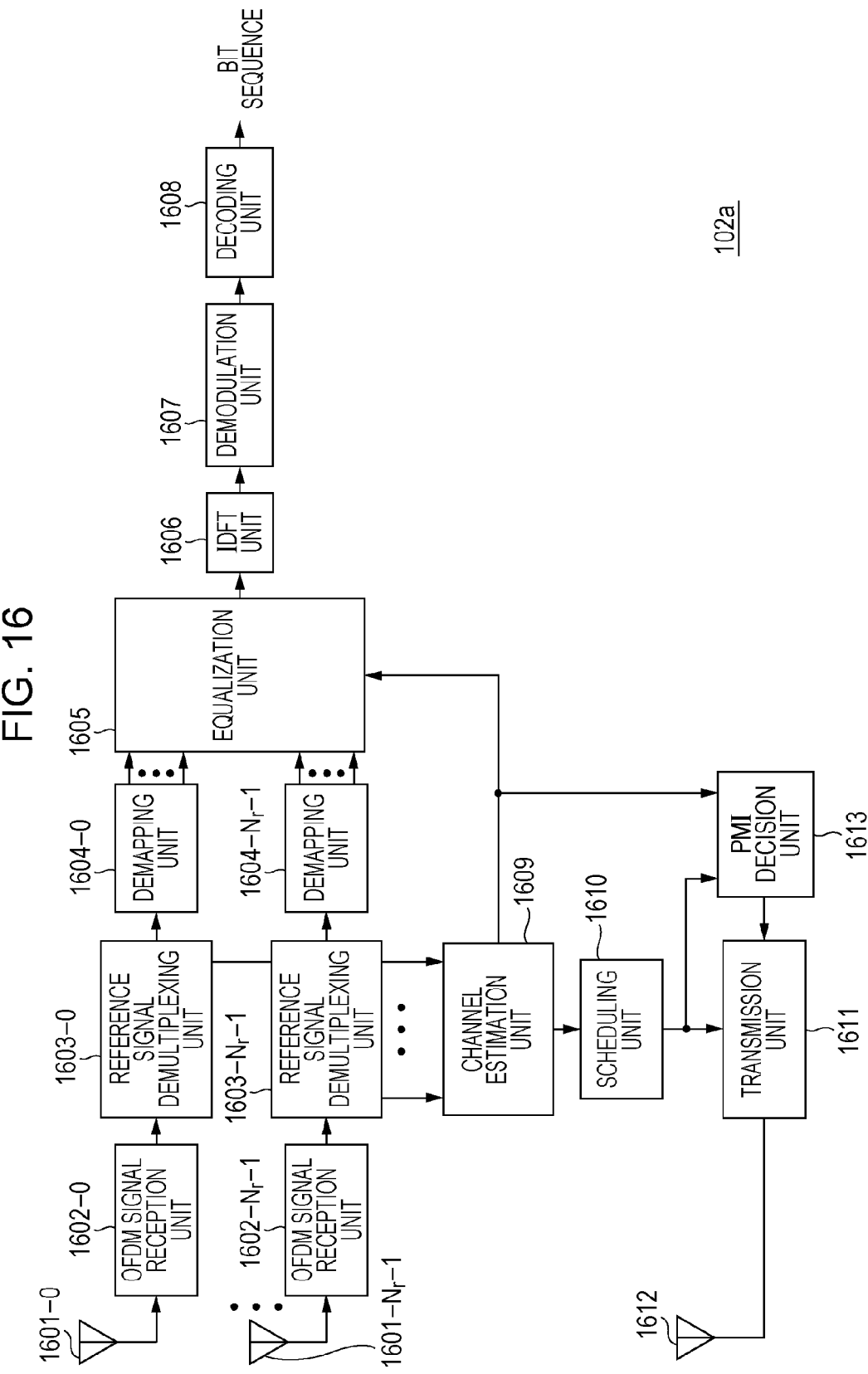
FIG. 16 is a schematic block diagram illustrating a configuration of a base station in the embodiment.

FIG. 16 is a schematic block diagram illustrating a configuration of the base station 102*a* in this embodiment.

The base station 102*a* includes receive antennas 1601-0 to 1601-N$_r$-1, OFDM signal reception units 1602-0 to 1602-N$_r$-1, reference signal demultiplexing units 1603-0 to 1603-N$_r$-1, demapping units 1604-0 to 1604-N$_r$-1, an equalization unit 1605, an IDFT unit 1606, a demodulation unit 1607, a decoding unit 1608, a channel estimation unit 1609, a scheduling unit 1610, a transmission unit 1611, a transmit antenna 1612, and a PMI decision unit 1613.

The following describes a case where signals transmitted from the terminal 101*a* through single-carrier transmission are received using the individual receive antennas 1601-0 to 1601-1-N$_r$-1 of the base station 102*a*.

In the first embodiment, which has been described first, it is difficult to perform signal demultiplexing with one receive antenna in the case of frequency assignment that causes interference. In this second embodiment, however, because transmission is performed so as not to cause any interference, one receive antenna of the base station is used. However, for convenience of describing a generalized case in which the number of ranks is larger than one in this embodiment, multiple receive antennas are illustrated as the receive antennas 1601-0 to 1601-N$_r$-1.

When the configuration of the base station configuration 102*a* is compared with the configuration (FIG. 5) of the base station 102 in the first embodiment, the former additionally includes the PMI decision unit 1613. The former and the latter differ only in connections between the PMI decision unit 1613 and the other components but are the same regarding the other components and connections therebetween. Thus, the following just describes connections between the PMI decision unit 1613 and the other components.

In this embodiment, in the terminal 101*a*, the precoding unit 904 precodes to-be-transmitted signals in accordance with channels. Thus, pieces of frequency assignment information for the individual transmit antennas 1409-0 to 1409-N$_t$-1 of the terminal 101*a*, which are notified by the scheduling unit 1610, and channel estimates, which are output by the channel estimation unit 1609, are input to the PMI decision unit 513 of the base station 102*a*.

The PMI decision unit 1613 multiples each of the channel estimates for frequency assignment input from the scheduling unit 1610 by each of a plurality of precoding matrices prepared in advance by the PMI decision unit 1613 (for example, in the case of Table 1, multiplication is performed by using each PMI). The PMI decision unit 1613 outputs to the transmission unit 1611 a PMI indicating a precoding matrix that maximizes the SINR (Signal to Interference plus Noise power Ratio), the SNR (Signal to Noise power Ratio), or a channel capacity.

The transmission unit 1611 transmits, to the terminal 101*a* via the transmit antenna 1612, as control information, the pieces of frequency assignment information input from the scheduling unit 1610 and the precoding matrix indicator (PMI) input from the PMI decision unit 1613.

In the case of performing MU-MIMO (Multi-User MIMO) in which the time and frequency are shared among multiple terminals of FIG. 1, channels of other terminals may be taken into consideration in deciding the PMI, so that precoding may be performed which enables easier signal demultiplexing at the base station at the reception side.

On the other hand, each of the demapping units 1604-0 to 1604-N$_r$-1 extracts received frequency spectra of each spectrum at frequency points used for transmission, from the input $N_{FFT}$-point received spectra of the data signals.

For example, extraction of the transmission frequency spectrum $S(1)$ in frequency assignment illustrated in FIG. 12C will be considered. The transmission frequency spectrum S(1) is transmitted from the zeroth transmit antenna by using the second frequency point and from the first transmit antenna by using the eighth frequency point. Accordingly, each of the demapping units 1604-0 to 1604-N$_r$-1 extracts the second and eighth frequency points, and inputs the results to the equalization unit 1605.

In addition, the transmission frequency spectrum S(4) is transmitted as S$_0$(4) from the zeroth transmit antenna by using the fifth frequency point and as S$_1$(4) from the first transmit antenna also by using the fifth frequency point. Thus, each of the demapping units 1604-0 to 1604-N$_r$-1 extracts only the received signal at the fifth frequency point, and inputs the received signal to the equalization unit 1605. Such processing is performed on all the N$_{DFT}$ transmission frequency spectra.

Next, processing performed by the equalization unit 1605 when assignment illustrated in FIG. 13B is performed will be described.

As an example, a case of performing equalization of the transmission frequency spectrum S(1) will be described. Let R$_n$(k) denote a received signal received at a k-th frequency point by an n-th receive antenna. Then, received signals R$_n$(1), R$_n$(7), R$_n$(13), and R$_n$(19) of the transmission frequency spectrum S(1), which are input from the demapping unit 1604-n, are expressed by the following expression 24.

$$\begin{cases} R_n(1) = H_{n,2}(1)w_2 S(1) \\ \quad = \tilde{H}_n(1)S(1) \\ R_n(7) = H_{n,1}(7)w_1 S(1) + H_{n,3}(7)w_3 S(1) \\ \quad = \tilde{H}_n(7)S(1) \\ R_n(13) = H_{n,0}(13)w_0 S(1) \\ \quad = \tilde{H}_n(13)S(1) \\ R_n(19) = H_{n,4}(19)w_4 S(1) \\ \quad = \tilde{H}_n(19)S(1) \end{cases} \quad \text{[Math. 24]}$$

Here, H$_{n,l}$(k) denotes a channel gain at the k-th frequency point between an l-th transmit antenna and the n-th receive antenna. In the expression 24, noise is ignored. Because the transmission frequency spectrum S(1) is received at the first, seventh, thirteenth, and nineteenth frequency points, it can be considered that the transmission frequency spectrum S(1) is received with receive antennas, the number of which is quadrupled.

Figure 17:
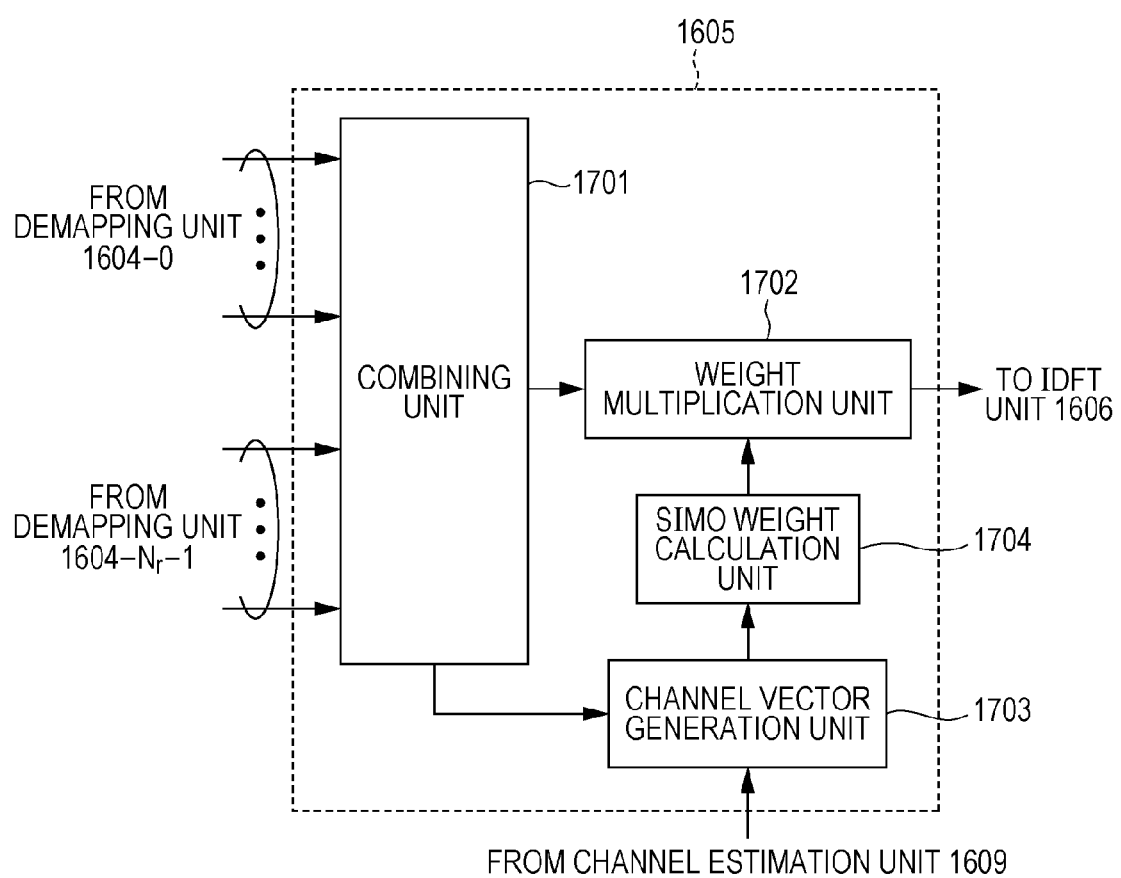
FIG. 17 is a schematic block diagram of an equalization unit in the embodiment.

FIG. 17 is a block diagram illustrating the details of the equalization unit 1605. The equalization unit 1605 includes a combining unit 1701, a weight multiplication unit 1702, a channel vector generation unit 1703, and a SIMO weight calculation unit 1704.

To the equalization unit 1605, N$_{DFT}$×N$_t$ values are input from the demapping unit 1604-0. Similarly, N$_{DFT}$×N$_t$ values are input also from the last demapping unit 1604-N$_r$-1. Thus, to the equalization unit 1605, N$_{DFT}$×N$_t$×N$_r$ values are input from the demapping units 1604-0 to 1604-N$_r$-1.

Accordingly, the combining unit 1701 of the equalization unit 1605 combines the spectra at the individual receive frequency points to generate 4N$_r$×1 vector R$_{S(1)}$. The vector R$_{S(1)}$ that the combining unit 1701 inputs to the weight multiplication unit 1702 is expressed by the following expression 25.

$$R_{S(1)} = \begin{bmatrix} R_0(1) \\ \vdots \\ R_{Nr-1}(1) \\ R_0(7) \\ \vdots \\ R_{Nr-1}(7) \\ R_0(13) \\ \vdots \\ R_{Nr-1}(13) \\ R_0(19) \\ \vdots \\ R_{Nr-1}(19) \end{bmatrix} = \begin{bmatrix} \tilde{H}_0(1) \\ \vdots \\ \tilde{H}_{Nr-1}(1) \\ \tilde{H}_0(7) \\ \vdots \\ \tilde{H}_{Nr-1}(7) \\ \tilde{H}_0(13) \\ \vdots \\ \tilde{H}_{Nr-1}(13) \\ \tilde{H}_0(19) \\ \vdots \\ \tilde{H}_{Nr-1}(19) \end{bmatrix} S(1) = \tilde{H}_{S(1)} S(1) \quad \text{[Math. 25]}$$

To the channel vector generation unit 1703, information that allows the channel estimates input from the channel estimation unit 1609 to constitute $$\tilde{H}_{S(1)} \quad \text{[Math. 26]}$$

in the expression 25 is input from the combining unit 1701. The channel vector generation unit 1703 inputs an estimate of the expression 26 to the SIMO weight calculation unit 1704.

Unlike the first embodiment, there is no interfering transmitted signal in this embodiment. Thus, a channel matrix is not generated but a channel vector (or scalar) is generated.

To perform equalization of the transmission frequency spectrum S(1), the SIMO weight calculation unit 1704 calculates a SIMO weight vector w$_{S(1)}$ in the interference free case, which is to be multiplied by a received spectrum received at the k-th frequency point by the n-th receive antenna. The 1×4N$_r$ weight vector w$_{S(1)}$ (with one row and 4N$_r$ columns) is expressed by the following expression 27.

$$w_{S(1)} = \frac{1}{\tilde{H}_{S(1)}^H \tilde{H}_{S(1)} + \sigma^2} \tilde{H}_{S(1)}^H \quad \text{[Math. 27]}$$

Here, σ$^2$ denotes the average noise power. Specifically, by using the estimate of the channel matrix H$_{S(1)}$ input from the channel vector generation unit 1703 and the estimate of the average noise power input from a noise estimation unit not illustrated, the SIMO weight calculation unit 1704 performs a calculation of the expression 27 to find the SIMO weight vector w$_{S(1)}$. The SIMO weight calculation unit 1704 inputs the SIMO weight vector w$_{S(1)}$ to the weight multiplication unit 1702.

While the expression 27 expresses an MMSE (Minimum Mean Square Error) weight as an example, the weight may be a ZF (Zero Forcing) weight in which the average noise power is not taken into consideration or an MRC (Maximum Ratio Combining) weight. Furthermore, other signal demultiplexing methods, such as iterative equalization processing and MLD (Maximum Likelihood Detection), are also usable.

As described above, transmit diversity gain can be obtained effectively by generating a weight while taking into account that combination is performed at multiple frequency points at which the same spectrum is transmitted (in the above example the transmission frequency spectrum S(1) is transmitted at the first, seventh, thirteenth, and nineteenth frequency points). Also, unlike the weight used in the first embodiment, an inverse matrix operation for calculating the MIMO weight as in the expression 4 does not involve on any frequency assignment because there is no interference. Thus, the amount of calculation can be reduced, resulting in speedy processing.

The weight multiplication unit 1702 multiplies $R_{S(1)}$ input from the combining unit 1701 by $w_{S(1)}$ to find $$\tilde{S}(1) \quad [\text{Math. 28}]$$

which is the equalized transmission frequency spectrum S(1). The equalized S(1) is expressed by the following expression.

$$\tilde{S}(1) = w_{S(1)} R_{S(1)} \quad [\text{Math. 29}]$$

As described above, the terminal 101a can transmit the same data without causing inter-antenna interference by performing a spectra cyclic shift even in the case where assigned frequencies differ between transmit antennas.

For example, in the case of frequency assignment illustrated in FIG. 13B, the transmission frequency spectrum S(0) is transmitted at the sixth frequency point from three transmit antennas. Thus, the precoding-based transmit antenna diversity effect for three transmit antennas can be obtained.

Furthermore, the transmission frequency spectrum S(0) is also transmitted at the twelfth and eighteenth frequency points. Thus, in addition to precoding gain, frequency diversity gain can also be obtained.

In the case where signals from other terminals are multiplexed at some or all of the frequency points used for transmission, i.e., in the case of MU-MIMO (Multi-User MIMO), a weight is calculated in consideration of interference as described in the first embodiment. Furthermore, the case of single-user MIMO in which a terminal transmits two or more layers (or streams or ranks) may also be handled.

According to this embodiment, transmission can be performed at each frequency point without causing inter-antenna interference in a system that performs communication by using different frequency assignment for each transmit antenna. Thus, at the base station 102a, the equalization unit 1605 can perform equalization by using a weight, which requires a small amount of calculation, because there is no interference from other antennas. Furthermore, precoding-based transmit diversity is usable so that signals transmitted from individual transmit antennas are combined in phase at a receive antenna.

The base station can also perform accurate equalization by generating a weight while taking into account that spectra received on various frequencies are to be combined. Moreover, a coverage can be widened because the PAPR characteristic of the transmit signal is maintained at each transmit antenna.

In this embodiment, the case has been described in which the number of to-be-transmitted streams (which also referred to as "pieces of independent data", "ranks", or "layers") is one. When the number of ranks is less than the number of transmit antennas, for example, when three streams are transmitted by using four transmit antennas, this embodiment is applied for two antennas that transmit the same signal and an existing signal demultiplexing method is applied for two streams that are transmitted from the other two antennas, enabling good transmissions.

Third Embodiment

The second embodiment has shown the case of closed-loop transmit diversity in which precoding is performed in accordance with control information notified by the base station. However, in the case where the terminal is moving fast or in the case where no information regarding channel states (such as channel state information itself or the precoding matrix indicator PMI) is notified by the base station, closed-loop transmit diversity is unable to be performed.

Accordingly, in this embodiment, the case of applying open-loop transmit diversity will be described.

First, STBC (Space Time Block Coding) will be described. Table 2 illustrates space time block coding (also referred to as "Alamauti coding") in the case of two transmit antennas.

TABLE 2

|  | Zeroth Transmit Antenna | First Transmit Antenna |
|---|---|---|
| Time T | A | B |
| Time T + 1 | B* | −A* |

Here, *represents a complex conjugation operation.

As illustrated in Table 2, in STBC (Space Time Block Coding), two different pieces of data A and B are encoded in a manner as illustrated in Table 2 by using two adjacent transmission timings, i.e., time T and time T+1, and are transmitted from the transmit antennas of the terminal with overlap, i.e., with redundancy. In the case of applying space time block coding to SC-FDMA, space time block coding is performed by using $N_{DFT}$-point frequency spectra A(m) ($0 \leq m \leq N_{DFT}-1$) and $N_{DFT}$-point frequency spectra B(m) ($0 \leq m \leq N_{DFT}-1$) output by a DFT unit.

The following describes space time block coding STBC in SC-FDMA. Also, a description will be given in which the terminal and the base station in this embodiment are assigned references 101b and 102b, respectively.

Figure 18:
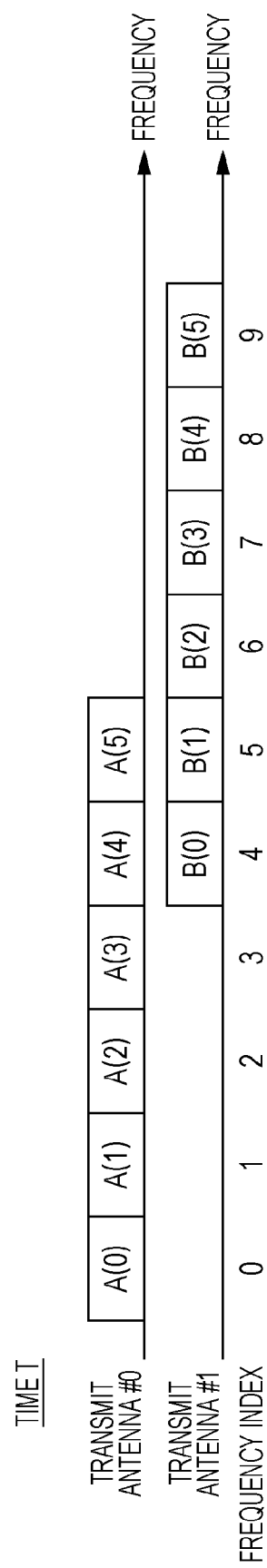
FIG. 18 is a diagram illustrating an example of one of a frequency assignment pair in a third embodiment.

FIG. 18 illustrates an example of transmission frequency spectra for a zeroth transmit antenna (transmit antenna #0) and a first transmit antenna (transmit antenna #1) at a time T.

As illustrated in FIG. 18, the terminal 101b transmits different transmission frequency spectra A(m) and B(m) by using partially overlapping frequency assignment.

Specifically, it is assumed that, at the time T, the terminal 101b transmits the transmission frequency spectra A(0) to A(5), which are assigned to frequency points with indices 0 to 5, respectively, from the zeroth transmit antenna (transmit antenna #0); and transmits the transmission frequency spectra B(0) to B(5), which are assigned to frequency points with indices 4 to 9, respectively, from the first transmit antenna (transmit antenna #1). The transmission frequency spectra transmitted from both the transmit antennas partially overlap at the frequency points with the indices 4 and 5.

Figure 19A:
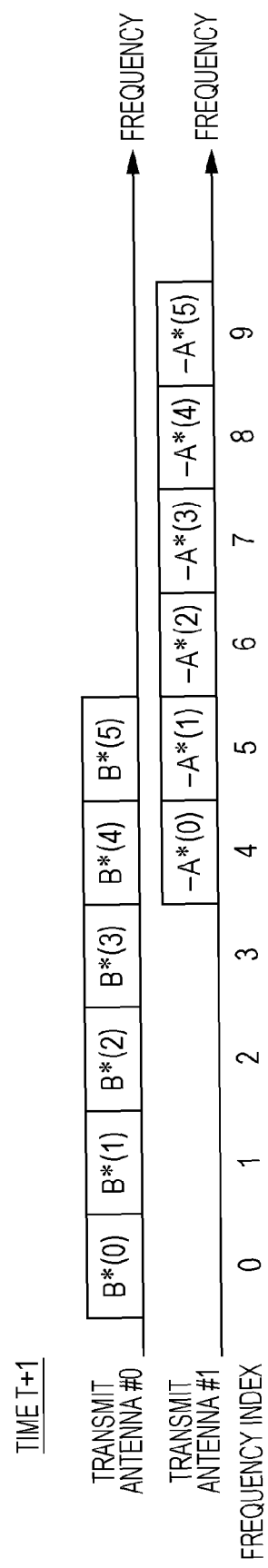
FIG. 19A is a diagram illustrating an example of the other of the frequency assignment pair before a cyclic shift is performed in the embodiment.

Next, FIGS. 19A, B, and C illustrate examples of spectra transmitted from the individual transmit antennas at the adjacent time T+1.

It is assumed that frequency assignment for each transmit antenna matches that of the above-described case of the time T.

FIG. 19A illustrates frequency assignment in the case where a frequency cyclic shift is not applied but space time block coding of Table 2 is applied when frequencies partially overlap.

Specifically, as illustrated in FIG. 19A, at the adjacent time T+1, complex conjugates B*(0) to B*(5) of transmission frequency spectra B(0) to B(5) are transmitted from the zeroth transmit antenna (transmit antenna #0) with being assigned to frequency points with indices 0 to 5. From the first antenna (transmit antenna #1), −A*(0) to −A*(5) obtained by multiplying complex conjugates of transmission frequency spectra A(0) to A(5) by −1 are transmitted with being assigned to frequency points with indices 4 to 9.

Here, space time block coding is a technique that enables the base station to separate two different pieces of data by using two transmission timings T and T+1. For example, at the fourth frequency point, A(4) and B(0) are transmitted at the time T, whereas B*(4) and −A*(0) are transmitted at the time T+1. As a result, four different transmission frequency spectra are transmitted at two transmission timings with overlap. Thus, it is difficult to separate these four spectra at the base station without interference.

Accordingly, because A(4) and B(0) are transmitted at the fourth frequency point at the time T, B*(0) and −A*(4) are transmitted from the zeroth transmit antenna (transmit antenna #0) and the first transmit antenna (transmit antenna #1), respectively, at the time T+1 by using space time block coding as illustrated in FIG. 19B. Similarly at the fifth frequency point, space time block coding is performed on A(5) and B(1), and B*(1) and −A*(5) are transmitted from the zeroth transmit antenna and the first transmit antenna, respectively, at the time T+1.

That is, space time block coding is performed in a manner as illustrated in FIG. 19B. As a result, at the fourth and fifth frequency points, two different transmission frequency spectra are transmitted at two transmission timings with overlap, enabling separation at the base station.

In FIG. 19B, assignment of frequency spectra is undone at the zeroth frequency point to the third frequency point for the zeroth transmit antenna and at the sixth to ninth frequency points for the first transmit antenna. Because no interference is caused by other antennas at frequency points where assignment is undone in FIG. 19B, any spectra may be transmitted thereat. For example, at the time T+1, B(2), B(3), B(4), and B(5) are transmitted at the zeroth to third frequency points for the zeroth transmit antenna (transmit antenna #0), whereas A(0), A(1), A(2), and A(3) may be transmitted at the sixth to ninth frequency points for the first transmit antenna (transmit antenna #1).

In such a case, however, spectra that are transmitted at the fourth and fifth frequency points from the zeroth and first transmit antennas are obtained by performing a complex conjugation operation on the original spectra and then, particularly for the first transmit antenna, multiplying the resultant spectra by the negative sign. Consequently, these spectra are not associated with the spectra at the other frequency points through a DFT operation and are independent. For this reason, when conversion into the time domain is performed, the peak to average power ratio (PAPR) rises. Accordingly, as illustrated in FIG. 19C, space time block coding is performed at frequency points at which assigned frequencies do not overlap those of the other antenna before transmission, similarly to the overlapping frequency points.

Figure 19C:
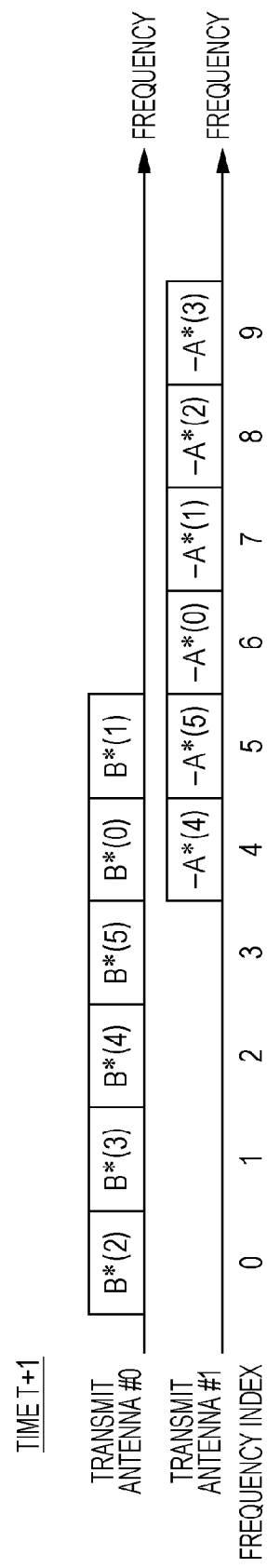
FIG. 19C is a diagram illustrating an example of the other of the frequency assignment pair after a cyclic shift is performed in the embodiment.

As illustrated in FIG. 19C, even if space time block coding is performed, the PAPR can be maintained low by assigning spectra so as to make the spectra cyclical.

Figure 20:
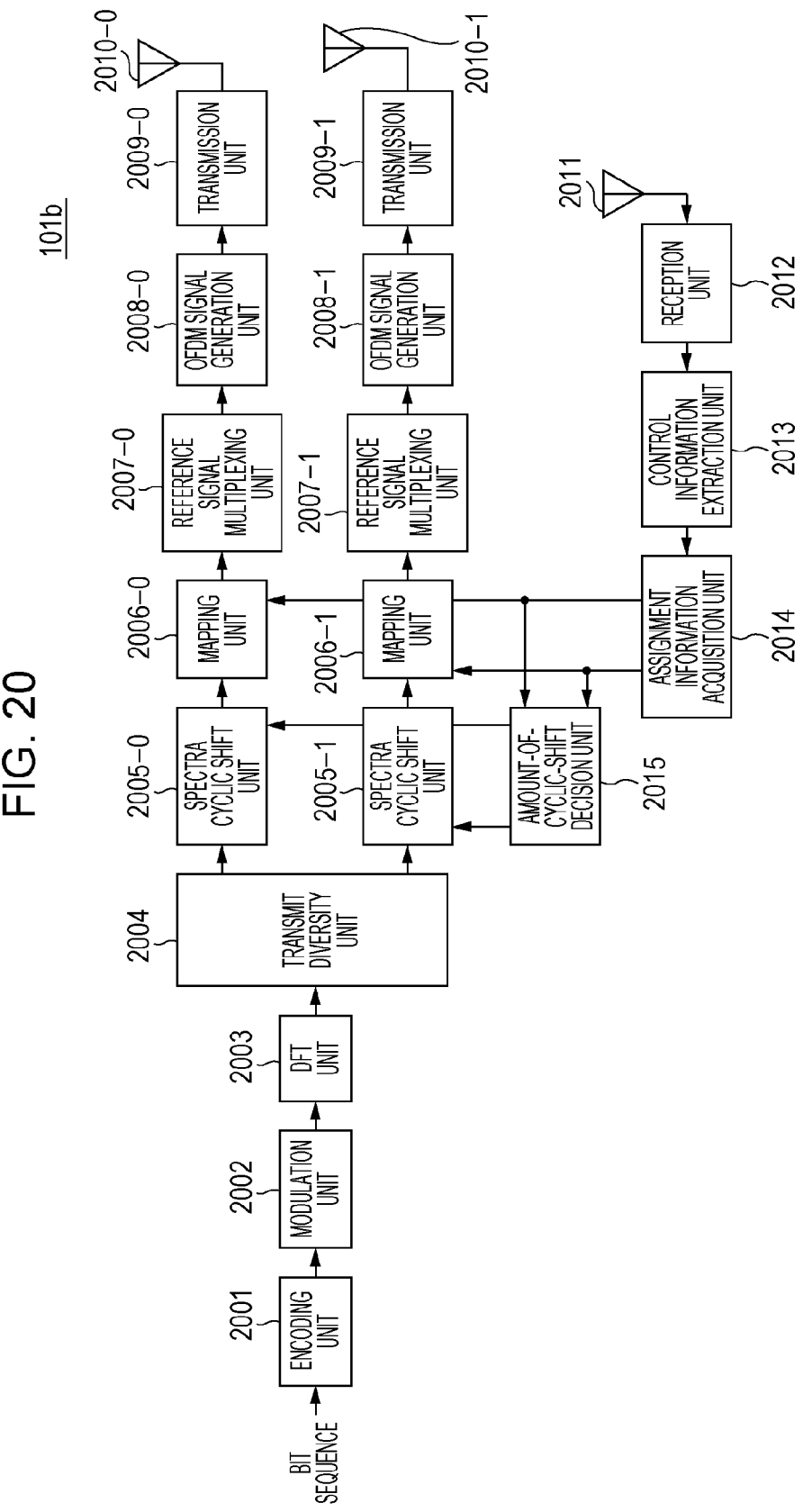
FIG. 20 is a schematic block diagram illustrating a configuration of a terminal in the embodiment.

FIG. 20 illustrates a specific configuration of the terminal 101b in this embodiment.

The terminal 101b includes an encoding unit 2001, a modulation unit 2002, a DFT unit 2003, a transmit diversity unit 2004, spectra cyclic shift units 2005-0 and 2005-1, mapping units 2006-0 and 2006-1, reference signal multiplexing units 2007-0 and 2007-1, OFDM signal generation units 2008-0 and 2008-1, transmission units 2009-0 and 2009-1, transmit antennas 2010-0 and 2010-1, a receive antenna 2011, a reception unit 2012, a control information extraction unit 2013, an assignment information acquisition unit 2014, and an amount-of-cyclic-shift decision unit 2015.

The following describes a case of transmitting the same data by using the transmit antennas 2010-0 and 2010-1 of the terminal 101b through single-carrier transmission with different frequency assignment.

Also, in this embodiment, the description will be given using space time block coding as open-loop transmit diversity. However, other types of open-loop transmit diversity, e.g., space frequency block coding SFBC and cyclic delay diversity CDD, are also usable.

It is assumed that the number of transmit antennas $N_t$ of the terminal 101b is two.

When the configuration of the terminal 101b is compared with the configuration (FIG. 9) of the mobile station configuration 101a in the second embodiment, the precoding unit 904 of the latter is replaced with the transmit diversity unit 2004 of the former and the former lacks the PMI acquisition unit 913 of the latter. In terms of functionalities thereof, because open-loop transmit diversity does not require channel state information, the terminal 101b is able to perform transmit diversity without notification information from the base station 102b, which differs from the second embodiment.

Because processing performed in the encoding unit 2001 to the DFT unit 2003 in this embodiment is the same as that in the first and second embodiments, the description thereof is incorporated. The two output SC-FDMA signals of the DFT unit 2003 are input to the transmit diversity unit 2004 at a time.

Based on Table 3 below, the transmit diversity unit 2004 performs space time block coding on the two SC-FDMA transmission frequency spectra A(m) and B(m). The transmit diversity unit 2004 inputs the results to the spectra cyclic shift units 2005-0 and 2005-1.

TABLE 3

|  | Zeroth Transmit Antenna | First Transmit Antenna |
|---|---|---|
| Time T | A(m) | B(m) |
| Time T + 1 | B*(m) | −A*(m) |

Figure 21:
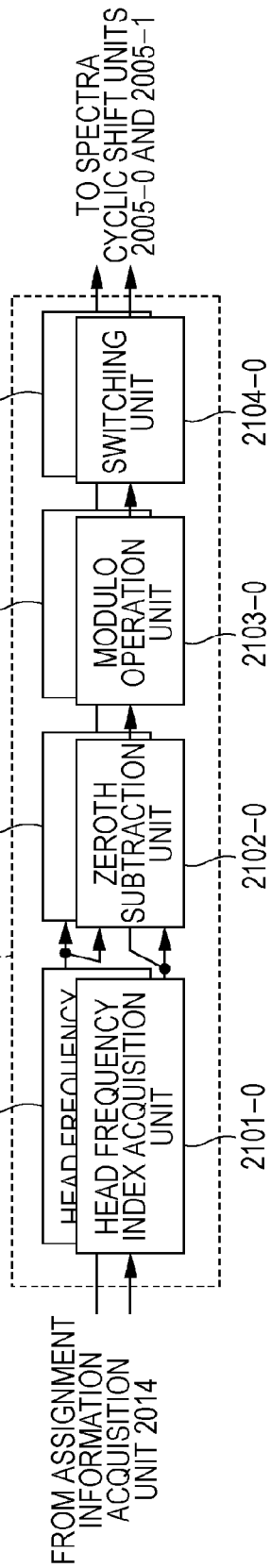
FIG. 21 is a schematic block diagram illustrating a configuration of an amount-of-cyclic-shift decision unit in the embodiment.

FIG. 21 is a block diagram illustrating the details of the amount-of-cyclic-shift decision unit 2015.

The amount-of-cyclic-shift decision unit 2015 includes head frequency index acquisition units 2101-0 and 2101-1, subtraction units 2102-0 and 2102-1, modulo operation units 2103-0 and 2103-1, and switching units 2104-0 and 2104-1.

To the head frequency index acquisition units 2101-0 and 2101-1, pieces of frequency assignment information for the individual transmit antennas 2010-0 and 2010-1 are input from the assignment information acquisition unit 2014. Each of the head frequency index acquisition units 2101-0 and 2101-1 acquires the head frequency index (for the lowest frequency) in the frequency assignment for the corresponding transmit antenna from the input assignment information.

For example, in the case of frequency assignment of FIG. 18 and FIG. 19A to FIG. 19C, the head frequency index acquisition unit 2101-0 outputs "0" as the head frequency index $k_{HEAD,0}$ for the zeroth transmit antenna 2010-0. For the first transmit antenna 2010-1, the head frequency index acquisition unit 2101-1 outputs "4" as the head frequency index $k_{HEAD,1}$.

The outputs $k_{HEAD,0}$ and $k_{HEAD,1}$ of the head frequency index acquisition units 2101-0 and 2101-1 are input to each of the two subtraction units 2102-0 and 2102-1. The subtraction units 2102-0 and 2102-1 subtract from the output of the corresponding one of the head frequency index acquisition units 2101-0 and 2101-01 the output of the other one of the head frequency index acquisition units to calculate $k_{dif,0}$ and $k_{dif,1}$, and output them to the modulo operation units 2103-0 and 2103-1, respectively. For example, the subtraction unit 2102-0 calculates $$k_{dif,0} = k_{HEAD,0} - k_{HEAD,1} \quad \text{[Math. 30]}$$
$$= 0 - 4$$
$$= -4$$

and inputs "−4" to the modulo operation unit 2103-0 as the difference $k_{dif,0}$. On the other hand, the subtraction unit 2102-1 calculates $$k_{dif,1} = k_{HEAD,1} - k_{HEAD,0} \quad \text{[Math. 31]}$$
$$= 4$$

and inputs "4" to the modulo operation unit 2103-1 as the difference $k_{dif,1}$.

Next, the modulo operation units 2103-0 and 2103-1 output the remainder obtained by dividing the input difference by $N_{DFT}$. Let $k_{dif,n}$ denote the input head frequency index. Then, the output $\Delta_n$ of the modulo operation unit 2103-$n$ is expressed by the following expression, where n=0, 1.

$$\Delta_n = k_{dif,n} \bmod N_{DFT} \quad \text{[Math. 32]}$$

The output $\Delta_n$ is input to the switching unit 2104-$n$. Although the modulo operation unit 2103-$n$ calculates the amount of cyclic shift $\Delta_n$, no cyclic shift is performed at the time T as illustrated in FIG. 18. Accordingly, the switching unit in FIG. 21 determines whether currently performed signal processing is for the time T or the time T+1 in space time block coding. In the case of the time T, $\Delta_n$=0 is output. In the case of the time T+1, the input from the modulo operation unit is output as the amount of cyclic shift $\Delta_n$ from the amount-of-cyclic-shift decision unit.

For example, in the case of frequency assignment illustrated in FIG. 18, because $k_{dif,0}$=−4 and $N_{DFT}$=6, the subtraction unit 2102-0 in FIG. 21 outputs $$\Delta_0 = -4 \bmod 6 \quad \text{[Math. 33]}$$
$$= 2$$

2 as the amount of cyclic shift $\Delta_0$. On the other hand, because $k_{dif,1}$=4 and $N_{DFT}$=6, the subtraction unit 2102-1 in FIG. 21 outputs $$\Delta_1 = 4 \bmod 6 \quad \text{[Math. 34]}$$
$$= 4$$

4 as the amount of cyclic shift $\Delta_1$.

By deciding the amount of cyclic shift in the manner as described above, cyclic shifts as illustrated in FIG. 19C can be performed.

Accordingly, the amount-of-cyclic-shift decision unit 2015 can decide the amount of cyclic shift by calculating the difference between the head frequency indices in frequency assignments for the transmit antennas 2010-0 and 2010-1 and then calculating the remainder obtained when the difference is divided by $N_{DFT}$.

In FIGS. 18 and 19A to C, no cyclic shift is applied for the time T and cyclic shifts are applied to signals transmitted at the time T+1. However, because the cyclic shifts are relative shifts, cyclic shifts may be applied to signals transmitted at the time T and no cyclic shift may be applied to signals transmitted at time T+1, or cyclic shifts may be applied for both times.

The configuration of the terminal 101b in FIG. 20 is the same as the terminal configuration of FIG. 9 according to the second embodiment except for the above one. Signals are transmitted from individual transmit antennas after undergoing certain signal processing.

The signals transmitted from the terminal 101b are received by a receive antenna of the base station 102b via a wireless channel.

In the case of frequency assignment that causes interference, it is difficult to separate the signals with one receive antenna in the first embodiment. However, as in the second embodiment, one receive antenna is sufficient enough because transmission is performed so as not to cause interference in this embodiment.

Figure 22:
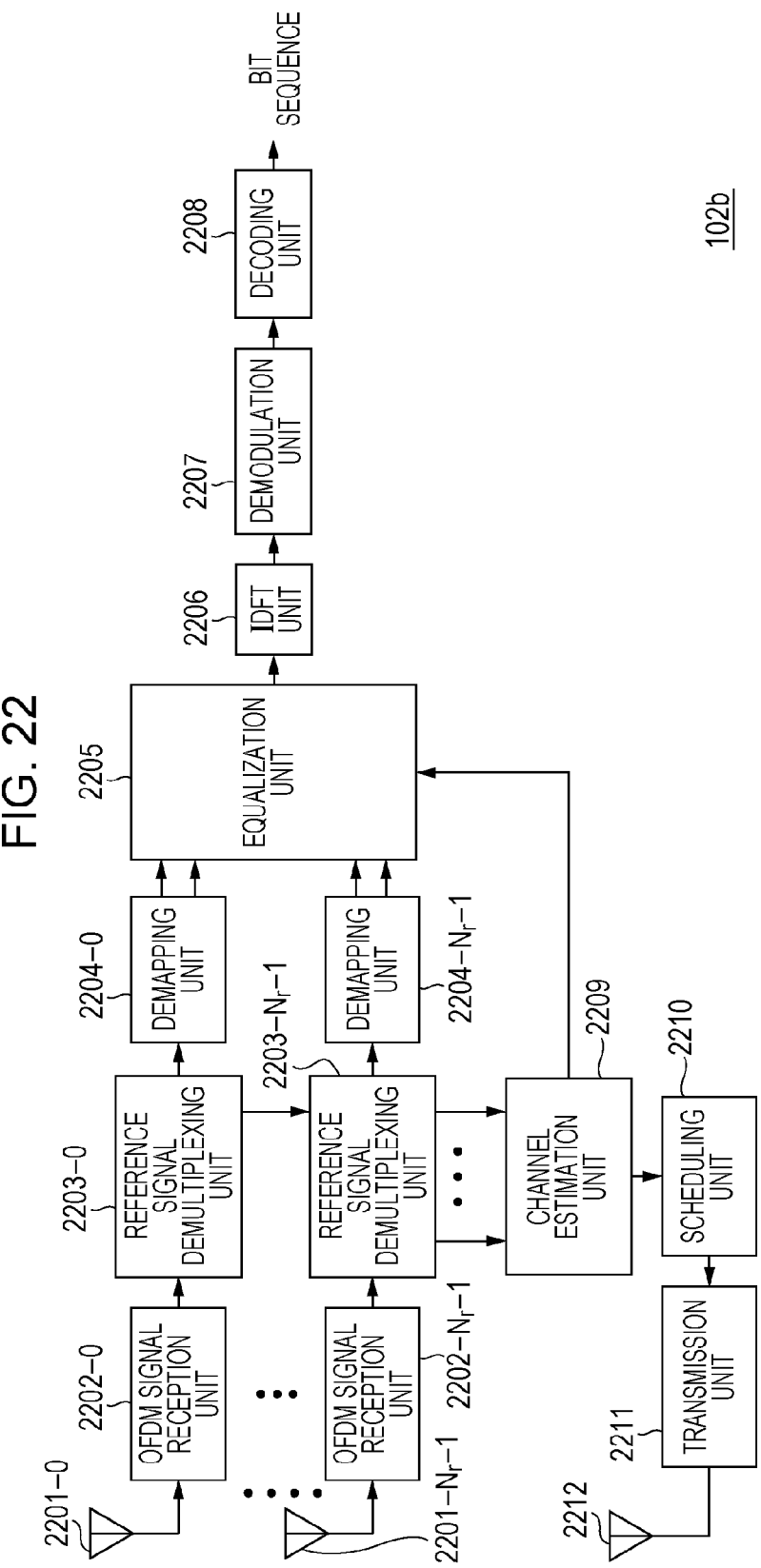
FIG. 22 is a schematic block diagram illustrating a configuration of a base station in the embodiment.

FIG. 22 is a block diagram illustrating a specific configuration of the base station 102b.

The base station 102b includes receive antennas 2201-0 to 2201-$N_r$-1, OFDM signal reception units 2202-0 to 2202-$N_r$-1, reference signal demultiplexing units 2203-0 to 2203-$N_r$-1, demapping units 2204-0 to 2204-$N_r$-1, an equalization unit 2205, an IDFT unit 2206, a demodulation unit 2207, a decoding unit 2208, a channel estimation unit 2209, a scheduling unit 2210, a transmission unit 2211, and a transmit antenna 2212.

The following describes a case where signals transmitted from the terminal 101a through single-carrier transmission are received by using the individual receive antennas 2201-0 to 2201-$N_r$-1 of the base station 102b.

When the configuration of the base station 102b in this embodiment is compared with the configuration (FIG. 5) of the base station 102 in the first embodiment, the configuration of the equalization unit 2205 of the former differs from that of the equalization unit 505 of the latter but the other components are the same.

Each of the demapping units 2204-0 to 2204-$N_r$-1 extracts received spectra of each spectrum at frequency points used for transmission, from the input $N_{FFT}$-point received spectra of the data signals.

For example, extraction of a transmission frequency spectrum A(4) in the case where transmission is performed at the time T using frequency assignment as illustrated in FIG. 18 and transmission is performed at the time T+1 using frequency assignment as illustrated in FIG. 19C will be considered. The transmission frequency spectrum A(4) is transmitted using the fourth frequency point from the zeroth transmit antenna at the time T and from the first transmit antenna at the time T+1.

Accordingly, each of the demapping units 2204-0 to 2204-$N_r$-1 extracts two frequency signals at the fourth frequency point at the time T and the time T+1, and inputs the two frequency signals to the equalization unit 2205. Let $R_{n,t}(k)$ denote a received signal received at a k-th frequency point by an n-th receive antenna at a time t. Also, it is assumed that there is no time variation in channels for the two SC-FDMA symbols on which space time block coding is performed. Then, received signals $R_{n,T}(4)$ and $R_{n,T+1}(4)$ of A(4) that are input to the equalization unit 2205 from the demapping units 2204-0 to 2204-$N_r$-1 are expressed by the following expression 37.

$$\begin{cases} R_{n,T}(4) = H_{n,0}(4)A(4) + H_{n,1}(4)B(0) \\ R_{n,T+1}(4) = H_{n,0}(4)B^*(0) - H_{n,1}(4)A^*(4) \end{cases} \quad \text{[Math. 35]}$$

The above two received frequency signals are input to the equalization unit 2205.

On the other hand, a spectrum that is transmitted on a non-overlapping frequency, for example, B(3) is transmitted using the seventh frequency point from the first transmit antenna at the time T and is transmitted using the first frequency point from the zeroth transmit antenna at the time T+1. Accordingly, each demapping unit extracts two frequency signals at the seventh frequency point at the time T and at the first frequency point at the time T+1, and inputs the two frequency signals to the equalization unit. Let $R_{n,t}(k)$ denote a received signal received at a k-th frequency point by an n-th receive antenna at a time t. Also, it is assumed that there is no time variation in channels for two SC-FDMA symbols on which space time block coding is performed. Then, received signals $R_{n,T}(7)$ and $R_{n,T+1}(1)$ of B(3) that are input to the equalization unit from the demapping units are expressed by the following expression 36.

$$\begin{cases} R_{n,T}(7) = H_{n,1}(7)B(3) \\ R_{n,T+1}(1) = H_{n,0}(1)B^*(3) \end{cases} \quad \text{[Math. 36]}$$

Such processing is performed on all the $N_{DFT}$ transmission frequency spectra.

Next, signal processing performed in the equalization unit 2205 of FIG. 22 will be described using FIG. 23.

Figure 23:
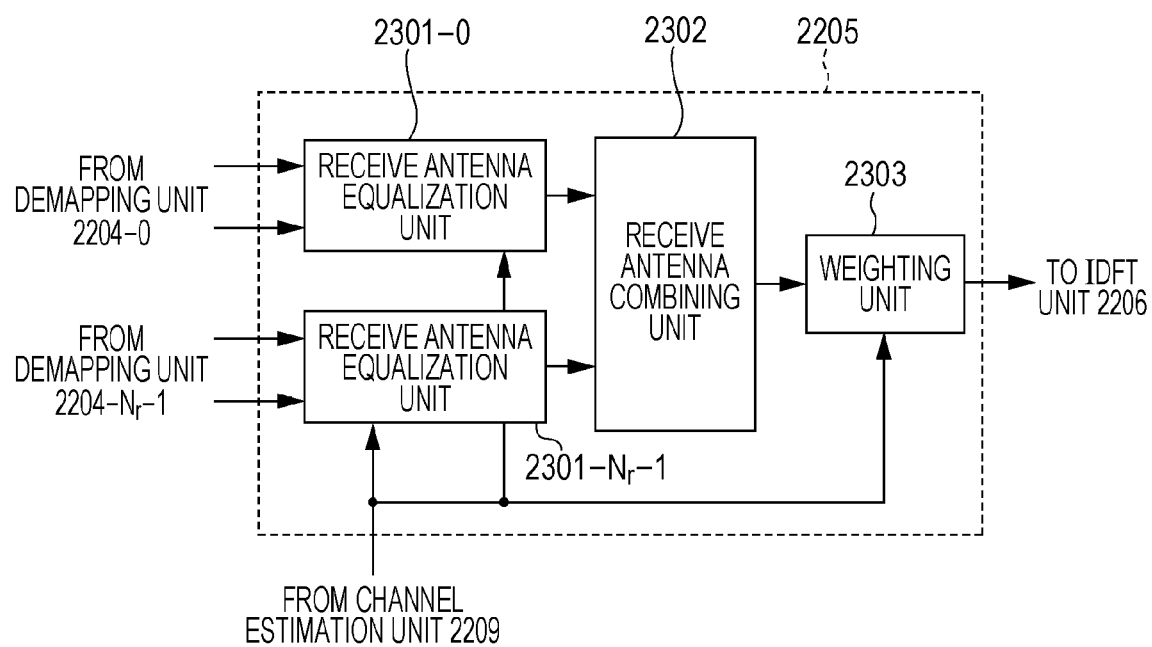
FIG. 23 is a schematic block diagram illustrating a configuration of an equalization unit in the embodiment.

FIG. 23 is a schematic block diagram illustrating the configuration of the equalization unit 2205.

The equalization unit 2205 includes receive antenna equalization units 2301-0 to 2301-$N_r$-1, a receive antenna combining unit 2302, and a weighting unit 2303.

The outputs of the demapping unit 2204-$n$ are input to the receive antenna equalization unit 2301-$n$ of the equalization unit 2205. The receive antenna equalization unit 2301-$n$ performs equalization processing for the corresponding one of the receive antennas 2201-0 to 2201-$N_r$-1 by using channel estimates input from the channel estimation unit 2209 in FIG. 22. The receive antenna equalization unit 2301-$n$ inputs the result to the receive antenna combining unit 2302.

The processing performed in the receive antenna equalization unit 2301-$n$ will be described later.

The outputs of the individual receive antenna equalization units 2301-0 to 2301-$N_r$-1 that are input to the receive antenna combining unit 2302 are combined by the receive antenna combining unit 2302, whereby the receive antenna diversity effect is obtained. The combined result is then input to the weighting unit 2302.

The weighting unit 2303 weights each spectrum so that the $N_{DFT}$ A(m) and the $N_{DFT}$ B(m) obtained are combined at an appropriate ratio. For example, in the case of weighting A(m) based on the MMSE criterion, a weight of the following expression is multiplied by the input.

$$w_{A(m)} = \frac{1}{\sum_{n=0}^{N_r-1} \sum_{l=0}^{N_t-1} |H_{n,l}(k)|^2 + \sigma^2} \quad \text{[Math. 37]}$$

Here, $\sigma^2$ in the denominator denotes the average noise power. The entire denominator indicates that all the powers at channels on which A(m) has been transmitted are summed and the average noise power is added to the sum. A specific example will be described later.

As the output of the equalization unit 2205, the signal weighted on a spectrum-by-spectrum basis is input to the IDFT unit 2206 in FIG. 22.

Now, signal processing performed in the receive antenna equalization unit 2301-$n$ will be described using FIG. 24.

Figure 24:
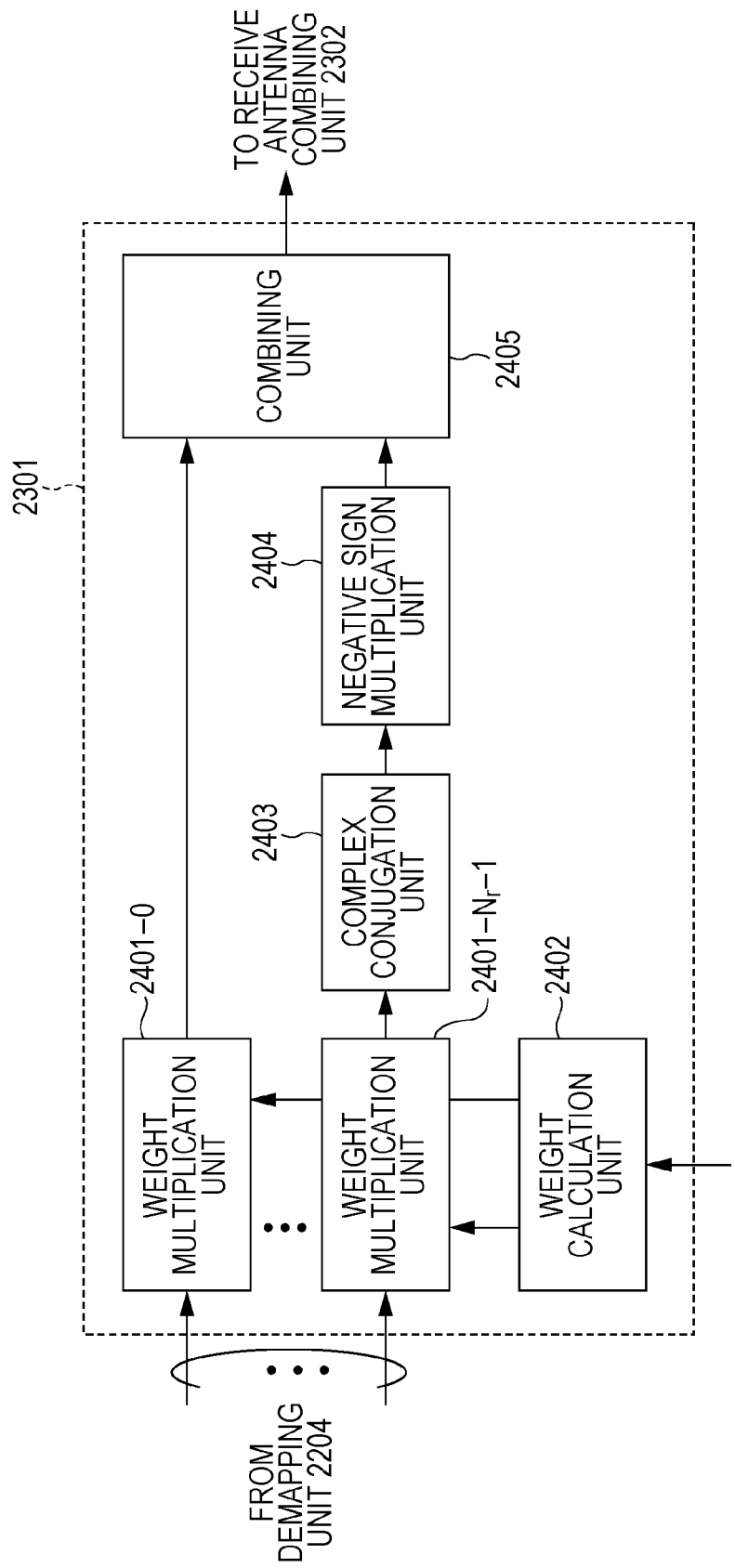
FIG. 24 is a schematic block diagram illustrating a configuration of a receive antenna equalization unit in the embodiment.

FIG. 24 is a schematic diagram illustrating the configuration of the receive antenna equalization unit 2301-$n$.

The receive antenna equalization unit 2301-$n$ includes weight multiplication units 2401-0 to 2401-$N_r$-1, a weight calculation unit 2402, a complex conjugation unit 2403, a negative sign multiplication unit 2404, and a combining unit 2405.

The two signals input from the demapping unit 2104-$n$ are input to the corresponding one of the weight multiplication units 2401-0 and 2401-1.

The weight multiplication units 2401-0 and 2401-1 multiply the signal input from the demapping unit 2401-$n$ by the signal input from the weight calculation unit 2402, and output the result.

Next, the weight calculation unit 2402 will be described. The weight calculation unit 2402 calculates a weight by using the input channel estimate. A weight $w_{n,l}(k)$ for an l-th transmit antenna to be multiplied by a received spectrum received at a k-th frequency point by an n-th receive antenna is expressed by the following expression 38.

$$w_{n,l}(k) = H^*_{n,l}(k) \quad \text{[Math. 38]}$$

Here, $H^*_{n,l}(k)$ denotes a complex conjugate of a channel gain between the l-th transmit antenna and the n-th receive antenna at the k-th frequency point.

The weight calculation unit 2402 inputs a weight for the zeroth transmit antenna and a weight for the first transmit antenna to the weight multiplication units 2401-0 and 2401-1, respectively.

The output of the weight multiplication unit 2401-0 is input to the combining unit 2405. On the other hand, the output of the weight multiplication unit 2401-1 is input to the complex conjugation unit 2403. The complex conjugation unit 2403 performs a complex conjugation operation on the input signal, and outputs the result to the negative sign multiplication unit 2404.

In the case of performing equalization of A(m), the negative sign multiplication unit 2404 multiplies the input signal by the negative (minus) sign, and outputs the result to the combining unit. In the case of performing equalization of B(m), the negative sign multiplication unit 2404 inputs the signal to the combining unit 2304 without performing any processing. The combining unit 2304 combines the two input signals to generate a signal that has been transmitted from each transmit antenna.

The combining unit 2405 performs combining processing on all the A(m) and B(m) (0≤m=$N_{DFT}$-1), and inputs the results to the receive antenna combining unit 2302 as outputs of the receive antenna equalization unit 2301-$n$.

Here, signal processing performed by the receive antenna equalization unit 2301-$n$ will be described by using A(4) and B(3) as an example.

In the case of equalization of A(4), the outputs of the weight multiplication units 2401-0 and 2401-1 are expressed as follows.

$$\begin{cases} \tilde{R}_{n,T}(4) = H_{n,0}^*(4) R_{n,T}(4) \\ \qquad = |H_{n,0}(4)|^2 A(4) + H_{n,0}^*(4) H_{n,1}(4) B(0) \\ \tilde{R}_{n,T+1}(4) = H_{n,1}^*(4) R_{n,T+1}(4) \\ \qquad = H_{n,1}^*(4) H_{n,0}(4) B^*(0) - |H_{n,1}(4)|^2 A^*(4) \end{cases} \quad \text{[Math. 39]}$$

The output of the weight multiplication unit 2401-1 then undergoes a complex conjugation operation by the complex conjugation unit 2403. Thus, the above expression is expressed as follows.

$$\begin{cases} \tilde{R}_{n,T}(4) = |H_{n,0}(4)|^2 A(4) + H_{n,0}^*(4) H_{n,1}(4) B(0) \\ \tilde{R}_{n,T+1}^*(4) = H_{n,1}(4) H_{n,0}^*(4) B(0) - |H_{n,1}(4)|^2 A(4) \end{cases} \quad \text{[Math. 40]}$$

The combining unit 2405, to which the two above-described signals have been input, combines the two signals.

Because the spectrum to be extracted now is not B(m) but A(m), the two signals are combined after the second signal (output of the complex conjugation unit 2303) is multiplied by the negative sign. Specifically, the equalized A(4)

$$\tilde{A}(4) \quad \text{[Math. 41]}$$

is expressed by the following expression.

$$\tilde{A}(4) = \tilde{R}_{n,T}(4) - \tilde{R}_{n,T+1}^*(4) \quad \text{[Math. 42]}$$
$$= (|H_{n,0}(4)|^2 + |H_{n,1}(4)|^2) A(4)$$

Here, based on the expression 37, a weight $w_{A(4)}$ which corresponds to the equalized A(4) and which is multiplied in the weighting unit 2303 in FIG. 23 in this case is expressed as $$w_{A(4)} = \frac{1}{\sum_{l=0}^{N_t-1} \sum_{n=0}^{N_r-1} |H_{n,l}(4)|^2 + \sigma^2}. \quad \text{[Math. 43]}$$

In this manner, pieces of information regarding B(0) contained in the received signals are cancelled out by combining the two received signals and only a desired spectrum A(4) can be extracted. Also, B(0) can be extracted in the similar manner.

Next, equalization of B(3) will be described.

In the case of equalization of B(3), the outputs of the weight multiplication units 2401-0 and 2401-1 are expressed as follows.

$$\begin{cases} \tilde{R}_{n,T}(7) = |H_{n,1}(7)|^2 B(3) \\ \tilde{R}_{n,T+1}^*(1) = |H_{n,0}(1)|^2 B(3) \end{cases} \quad \text{[Math. 44]}$$

The output of the weight multiplication unit 2301-1 then undergoes a complex conjugation operation by the complex conjugation unit 2303. Thus, the above expression is expressed as follows.

$$\begin{cases} \tilde{R}_{n,T}(7) = |H_{n,1}(7)|^2 B(3) \\ \tilde{R}_{n,T+1}^*(1) = |H_{n,0}(1)|^2 B(3) \end{cases} \quad \text{[Math. 45]}$$

The combining unit 2405, to which the two above-described signals have been input, combines the two signals. The spectrum to be extracted now is not A(m) but B(m). Thus, the two signals are combined without multiplying the second signal by the negative sign. That is, the equalized B(3)

$$\tilde{B}(3) \quad \text{[Math 46]}$$

is expressed by the following expression.

$$\tilde{B}(3) = \tilde{R}_{n,T}(7) + \tilde{R}_{n,T+1}^*(1) \quad \text{[Math. 47]}$$
$$= (|H_{n,0}(1)|^2 + |H_{n,1}(7)|^2) B(3)$$

Here, based on the expression 37, a weight $w_{B(3)}$ which corresponds to the equalized B(3) and which is multiplied in the weighting unit 2303 in FIG. 23 in this case is expressed as $$w_{B(3)} = \frac{1}{\sum_{n=0}^{N_r-1} |H_{n,0}(1)|^2 + \sum_{n=0}^{N_r-1} |H_{n,1}(7)|^2 + \sigma^2}. \quad \text{[Math. 48]}$$

By performing the same processing on transmission frequency spectra for which assignment does not overlap one another as that performed in the case where spectra overlaps, spectra received at different frequency points can be combined and good transmission performances can be obtained.

In this embodiment, the case has been described in which transmit diversity, which does not use channel state information, is applied to a system that performs transmission by using different bands for different antennas. By applying an appropriate cyclic shift for each transmit antenna in accordance with assigned frequencies before transmission in the case of performing such open-loop transmit diversity, occurrence of interference can be avoided at the base station. Thus, a good transmission can be performed. The description has been given using space time block coding as transmit diversity that does not use channel state information. However, this embodiment is obviously applicable to other types of open-loop transmit antenna diversity, such as SFBC in which Alamouti coding is performed on the frequency axis and CDD in which a cyclic shift is applied to a time-domain signal. Furthermore, precoding, which has been described in the second embodiment, is additionally usable in this embodiment. That is, closed-loop transmit diversity, such as space time block coding, and closed-loop transmit diversity, such as precoding, are usable concurrently. Also, the case where the number of to-be-transmitted streams (pieces of independent data, ranks, or layers) is 1 has been described. However, this embodiment is applicable to communication of two or more ranks using transmit diversity.

Execution of a computer program that controls a central processing unit CPU or the like by means of an internal microcomputer may be an alternative of numerous functions that have been described in the above embodiments regarding the present invention. Further, information handled by the apparatuses is temporarily accumulated in a storage device RAM during the processing thereof, also is stored on various recording devices ROM or magnetic storage devices HDD, and is read, modified/written by the CPU if necessary. The recording medium that stores the program thereon may be any of a semiconductor medium (e.g., a ROM, a nonvolatile memory card, or the like), an optical recording medium (e.g., a DVD, an MO, an MD, a CD, a BD, or the like), and a magnetic recording medium (e.g., a magnetic tape, a flexible disk, or the like). The functions of the above-described embodiments are implemented by executing the stored program. Also, the functions of the above-described embodiments of the present invention may be implemented by performing processing in cooperation with the operating system or other application programs based on instructions of the program.

Also, the computer program capable of executing the numerous functions that have been described in the above embodiments regarding the present invention may be stored on a portable recording medium and put into the market as an independent product, or may be put into the market by transferring the computer program to a server computer that is connected via a network, such as the Internet. In this case, the recording medium and a storage device of the server computer infringe the technical scope of the claims of the present invention.

Furthermore, a portion or the entirety of the terminal and the base station of the embodiments described above may typically be realized as an LSI, which is a semiconductor integrated circuit. Functional blocks of the terminal and the base station may be individually implemented as semiconductor chips, or they may be implemented as chips by integrating some or all of them.

In addition, the method of circuit integration is not restricted to LSI, and may be realized through a dedicated circuit or a general purpose processor as well.

While the embodiments of this invention have been described in detail with reference to the drawings above, specific configurations are not limited to these embodiments, and designs and so forth within a scope that does not depart from the spirit of the present invention are also covered by the claims.

INDUSTRIAL APPLICABILITY

This invention can be utilized in the field of mobile wireless communication and fixed wireless communication which use transmit diversity.

DESCRIPTION OF REFERENCE NUMERALS

101: terminal
102: base station
201: encoding unit
202: modulation unit
203: DFT unit
204: copy unit
205: mapping unit
206: reference signal multiplexing unit
207: OFDM signal generation unit
208: transmission unit
209: transmit antenna
210: receive antenna
211: reception unit
212: control information extraction unit
213: assignment information acquisition unit
501: receive antenna
502: OFDM signal reception unit
503: reference signal demultiplexing unit
504: demapping unit
505: equalization unit
506: IDFT unit
507: demodulation unit
508: decoding unit
509: channel estimation unit
510: scheduling unit
511: transmission unit
512: transmit antenna
901: encoding unit
902: modulation unit
903: DFT unit
904: precoding unit
905: spectra cyclic shift unit
906: mapping unit
907: reference signal multiplexing unit
908: OFDM signal generation unit
909: transmission unit
910: transmit antenna
911: receive antenna
912: reception unit
913: control information extraction unit
914: assignment information acquisition unit
915: PMI acquisition unit
1601: receive antenna
1602: OFDM signal reception unit
1603: reference signal demultiplexing unit
1604: demapping unit
1605: equalization unit
1606: IDFT unit
1607: demodulation unit
1608: decoding unit
1609: channel estimation unit
1610: scheduling unit
1611: transmission unit
1612: transmit antenna
1613: PMI decision unit
2001: encoding unit
202: modulation unit
2003: DFT unit
2004: transmit diversity unit
2005: spectra cyclic shift unit
2006: mapping unit
2007: reference signal multiplexing unit
2008: OFDM signal generation unit
2009: transmission unit
2010: transmit antenna
2011: receive antenna
2012: reception unit
2013: control information extraction unit
2014: assignment information acquisition unit
2015: amount-of-cyclic-shift decision unit
2201: receive antenna
2202: OFDM signal reception unit
2203: reference signal demultiplexing unit
2204: demapping unit
2205: equalization unit
2206: IDFT unit
2207: demodulation unit
2208: decoding unit
2209: channel estimation unit
2210: scheduling unit
2211: transmission unit
2212: transmit antenna

The invention claimed is:

1. A communication apparatus comprising:
a plurality of mapping units configured to:
receive a plurality of data signal sequences related to the same data signal sequence, arrange the received data signal sequences in a frequency domain, and
output the arranged data signal sequences as transmission frequency spectra;
an assignment information acquisition unit configured to control the plurality of mapping units based on assignment information to cause the data signal sequences arranged in the frequency domain to partially overlap;
an amount-of-cyclic-shift decision unit configured to decide an amount of cyclic shift based on control of the assignment information acquisition unit;
a spectra cyclic shift unit configured to:
shift, under control of the amount-of-cyclic-shift decision unit, the at least one input data signal sequence in the frequency domain by the amount of cyclic shift to cause partially overlapping data signals to be identical, and
output the at least one data signal sequence; and
a plurality of transmit antennas configured to transmit, at a radio frequency, the transmission frequency spectra output by the plurality of mapping units, wherein
the plurality of mapping units are configured to receive at least one of the plurality of data signal sequences via the spectra cyclic shift unit.

2. The communication apparatus according to claim 1, wherein
the plurality of mapping units are configured to receive all the plurality of data signal sequences via the spectra cyclic shift units.

3. The communication apparatus according to claim 1, further comprising:
a precoding unit configured to:
change amplitudes, phases, or both amplitudes and phases of data signals of the data signal sequences, and
input the data signal sequences directly to the mapping units or input the data signal sequences to the mapping units via the spectra cyclic shift units.

4. The communication apparatus according to claim 1, wherein
the spectra cyclic shift unit is configured to perform a cyclic shift by using, as a reference, the arrangement of the transmission frequency spectra for a specific transmit antenna among the plurality of transmit antennas.

5. The communication apparatus according to claim 1, wherein
the spectra cyclic shift unit is configured to perform a cyclic shift by using, as a reference, the index of the transmission frequency spectrum.

6. A communication system comprising:
a first communication apparatus; and
a second communication apparatus,
wherein the first communication apparatus comprises:
a plurality of mapping units configured to:
receive a plurality of data signal sequences related to the same data signal sequence,
arrange the received data signal sequences in a frequency domain, and
output the arranged data signal sequences as transmission frequency spectra;
an assignment information acquisition unit configured to control the plurality of mapping units based on assignment information to cause the data signal sequences arranged in the frequency domain to partially overlap;
an amount-of-cyclic-shift decision unit configured to decide an amount of cyclic shift based on control of the assignment information acquisition unit;
a spectra cyclic shift unit configured to:
shift, under control of the amount-of-cyclic-shift decision unit, the at least one input data signal sequence in the frequency domain by the amount of cyclic shift to cause partially overlapping data signals to be identical, and
output the at least one data signal sequence; and
a plurality of transmit antennas configured to transmit, at a radio frequency, the transmission frequency spectra output by the plurality of mapping units, and
the plurality of mapping units are configured to receive at least one of the plurality of data signal sequences via the spectra cyclic shift unit, wherein
the second communication apparatus comprises:
one or more receive antennas, and
an equalization unit configured to perform, for each of transmission frequency spectra fed from the one or more receive antennas, equalization by using a SIMO weight for a case without interference, and
the first communication apparatus is configured to transmit or receive data signals to or from the second communication apparatus.

7. A communication method comprising:
preparing a plurality of data signal sequences related to the same data signal sequence;
changing amplitudes, phases, or both amplitudes and phases of data signals of each of the plurality of data signal sequences;
applying cyclic shifts to the plurality of changed data signal sequences in a frequency domain;
arranging the plurality of cyclically shifted data signal sequences in the frequency domain so that the plurality of data signal sequences partially overlap and overlapping data signals are identical; and
transmitting, at a radio frequency, a plurality of sets of transmission frequency spectra obtained by the arrangement in the frequency domain, from a plurality of transmit antennas.

8. A communication method comprising:
allocating a sequence of a plurality of data signals to a plurality of first transmission subcarriers in specific symbols;
allocating in a frequency domain, a sequence of data signals that are the same as the plurality of data signals to a plurality of second transmission subcarriers in the specific symbols so that the plurality of first transmission subcarriers and the plurality of second transmission subcarriers partially overlap;
applying in a frequency domain, a cyclic shift to the sequence of the plurality of data signals allocated to the plurality of first transmission subcarriers, the sequence of the plurality of data signals allocated to the plurality of second transmission subcarriers, or both the sequences, so that the same data signal is allocated to each of a plurality of subcarriers where the first transmission subcarriers and the second transmission subcarriers partially overlap; and
transmitting the sequence of the plurality of data signals allocated to the first transmission subcarriers from a first transmit antenna and transmitting the sequence of the plurality of data signals allocated to the second transmission subcarriers from a second transmit antenna.

9. The communication method according to claim 8, wherein the first transmit antenna and the second transmit antenna are included in a single transmission apparatus.

10. The communication method according to claim 8, wherein the first transmit antenna is included in one transmission apparatus, and the second transmit antenna is included in another transmission apparatus.

11. The wireless communication method according to claim 9, further comprising:
applying precoding for changing amplitudes, phases, or both amplitudes and phases to the plurality of data signals.

12. A communication apparatus comprising:
a plurality of mapping units configured to:
arrange a plurality of data signal sequences related to the same data signal sequence in a frequency domain, and output the arranged data signal sequences as transmission frequency spectra;
an assignment information acquisition unit configured to control the plurality of mapping units based on assignment information to cause the arrangements of the data signal sequences in the frequency domain to be identical, to be separated, or to partially overlap; and
a plurality of transmit antennas configured to transmit, at a radio frequency, the transmission frequency spectra output by the plurality of mapping units.

13. A communication apparatus comprising:
one or more receive antennas configured to receive a plurality of data signal sequences obtained by performing a cyclic shift to the same signal sequence in a frequency domain; and
an equalization unit configured to perform, for each of transmission frequency spectra fed from the one or more receive antennas, equalization by using a SIMO weight for a case without interference and a MIMO weight for a case with interference.

14. A communication system comprising:
a first communication apparatus; and
a second communication apparatus,
wherein the first communication apparatus comprises:
a plurality of mapping units configured to:
arrange a plurality of data signal sequences related to the same data signal sequence in a frequency domain, and output the arranged data signal sequences as transmission frequency spectra;
an assignment information acquisition unit configured to control the plurality of mapping units based on assignment information to cause the arrangements of the data signal sequences in the frequency domain to be identical, to be separated, or to partially overlap; and
a plurality of transmit antennas configured to transmit, at a radio frequency, the transmission frequency spectra output by the plurality of mapping units, wherein
the second communication apparatus comprises:
one or more receive antennas; and
an equalization unit that performs, for each of transmission frequency spectra fed from the one or more receive antennas, equalization by using a SIMO weight for a case without interference and a MIMO weight for a case with interference, and
the first communication apparatus is configured to transmit or receive data signals to or from the second communication apparatus.

15. A communication method comprising:
preparing a plurality of data signal sequences related to the same data signal sequence;
arranging the plurality of data signal sequences in a frequency domain to cause the plurality of data signal sequences to be identical, to be separated, or to partially overlap; and
transmitting, at a radio frequency, a plurality of sets of transmission frequency spectra obtained by the arrangement in the frequency domain from a plurality of transmit antennas.

16. A communication method comprising:
receiving a plurality of data signal sequences obtained by performing a cyclic shift to the same signal sequence in a frequency domain; and
performing, for each of transmission frequency spectra, equalization by using a weight for a case without interference in a case without interference and by using a weight for a case with interference in a case with interference to restore the transmission frequency spectrum.

17. A communication apparatus comprising:
a transmit diversity unit configured to apply coding onto a plurality of data signal sequences, the coding belonging to open-loop diversity that includes space time block coding, space frequency block coding, and cyclic delay diversity;
a plurality of spectra cyclic shift units configured to cyclically shift by a predetermined amount, in a frequency domain, the plurality of data signal sequences output by the transmit diversity unit;
a plurality of mapping units configured to:
arrange the plurality of data signal sequences which are outputs of the plurality of spectra cyclic shift units in the frequency domain based on the predetermined amount so that the plurality of data signal sequences partially overlap, and
output the arranged data signal sequences as transmission frequency spectra; and
a plurality of transmit antennas configured to successively transmit, at a radio frequency, the transmission frequency spectra output by the plurality of mapping units at two adjacent timings.

18. The communication apparatus according to claim 17, wherein
the plurality of data signal sequences output by the transmit diversity units are constituted by a first data signal sequence, a second data signal sequence, a third data signal sequence, and a fourth data signal sequence, wherein
the second signal sequence includes signals that are complex conjugates of signals of the first signal sequence,
the third data signal sequence is different from the first data signal sequence, and
the fourth data signal sequence includes signals that are obtained by multiplying complex conjugates of signals of the third data signal sequence by the negative sign.

19. A communication apparatus comprising:
a plurality of receive antennas configured to receive a plurality of data signal sequences obtained by performing a cyclic shift to the same signal sequence in a frequency domain; and
an equalization unit configured to perform equalization on each of transmission frequency spectra fed from the receive antennas, wherein
the equalization unit comprises:
a weight calculation unit configured to calculate a weight used in equalization,
a complex conjugation unit configured to selectively perform a complex conjugation operation, and
a negative sign multiplication unit configured to selectively multiply the negative sign.

* * * * *